(12) United States Patent
Zhuang et al.

(10) Patent No.: US 10,749,804 B2
(45) Date of Patent: Aug. 18, 2020

(54) METHOD AND APPARATUS FOR IMPLEMENTING LOAD SHARING

(71) Applicant: HUAWEI TECHNOLOGIES CO., LTD., Shenzhen (CN)

(72) Inventors: Shunwan Zhuang, Beijing (CN); Shuanglong Chen, Beijing (CN); Zhenbin Li, Beijing (CN); Guoyi Chen, Beijing (CN); Jia Che, Beijing (CN); Nan Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 15/989,199

(22) Filed: May 25, 2018

(65) Prior Publication Data

US 2018/0278531 A1    Sep. 27, 2018

Related U.S. Application Data

(63) Continuation of application No. PCT/CN2016/106942, filed on Nov. 23, 2016.

(30) Foreign Application Priority Data

Nov. 26, 2015  (CN) .......................... 2015 1 0843538

(51) Int. Cl.
*H04L 12/803*  (2013.01)
*H04L 12/707*  (2013.01)
(Continued)

(52) U.S. Cl.
CPC ............ *H04L 47/125* (2013.01); *H04L 45/22* (2013.01); *H04L 45/38* (2013.01);
(Continued)

(58) Field of Classification Search
CPC ... H04L 47/125; H04L 45/7453; H04L 45/38; H04L 45/22; H04L 47/825; H04L 45/50
See application file for complete search history.

(56) References Cited

U.S. PATENT DOCUMENTS 6,275,572 B1 *  8/2001  Higuchi ............... H04Q 3/0091
                                                  379/111
7,802,001 B1 *  9/2010  Petry ....................... G06F 15/16
                                                  709/230

(Continued)

FOREIGN PATENT DOCUMENTS

| CN | 10132557 A | 12/2008 |
|---|---|---|
| CN | 102136989 A | 7/2011 |
| CN | 104601487 A | 5/2015 |

OTHER PUBLICATIONS

K. Lougheed et al, A Border Gateway Protocol (BGP). Network Working Group, rfc1105, Jun. 1989, 17 pages.
(Continued)

*Primary Examiner* — Jay P Patel
(74) *Attorney, Agent, or Firm* — Kilpatrick Townsend & Stockton LLP

(57) ABSTRACT

The present disclosure discloses a method and an apparatus for implementing load sharing. The method includes: for a congested first link on a first forwarding node, selecting, by a network device, a packet flow forwarded by using the first link; selecting a second link that may be used to forward the packet flow and that is not congested after available bandwidth of the second link is occupied by the packet flow, where the second link is a link between the first forwarding node and a second forwarding node; selecting a first hash gene corresponding to the second link; determining that a third link is not in a congested state after available bandwidth of the third link is occupied by the packet flow; and saving the first hash gene in a source node of the packet flow, (Continued)

where the third link is a link that is on the second forwarding node.

12 Claims, 8 Drawing Sheets

(51) Int. Cl.
    *H04L 12/721*     (2013.01)
    *H04L 12/743*     (2013.01)
    *H04L 12/911*     (2013.01)
    *H04L 12/723*     (2013.01)

(52) U.S. Cl.
    CPC ........ *H04L 45/7453* (2013.01); *H04L 47/825* (2013.01); *H04L 45/50* (2013.01)

(56) References Cited

U.S. PATENT DOCUMENTS

| | | | |
|---|---|---|---|
| 7,844,742 B2 * | 11/2010 | Pope | G06F 9/544 709/250 |
| 8,259,585 B1 * | 9/2012 | S P | H04L 45/125 370/237 |
| 9,036,481 B1 | 5/2015 | White | |
| 9,391,841 B2 * | 7/2016 | Pope | H04L 69/14 |
| 10,015,104 B2 * | 7/2018 | Pope | G06F 9/544 |
| 2007/0041326 A1 * | 2/2007 | Babiarz | H04L 41/5022 370/237 |
| 2009/0059895 A1 * | 3/2009 | Yasrebi | H04L 12/5691 370/352 |
| 2013/0286846 A1 | 10/2013 | Atlas et al. | |
| 2013/0343396 A1 * | 12/2013 | Yamashita | H04L 45/124 370/401 |
| 2014/0119193 A1 | 5/2014 | Anand et al. | |
| 2014/0280679 A1 * | 9/2014 | Dey | H04L 67/2842 709/213 |
| 2015/0023173 A1 * | 1/2015 | Sharma | H04L 47/122 370/236 |
| 2015/0080502 A1 * | 3/2015 | Gharda | C08L 71/00 524/12 |
| 2015/0127797 A1 * | 5/2015 | Attar | H04L 47/125 709/223 |
| 2015/0156106 A1 * | 6/2015 | Allan | H04L 45/123 370/238 |
| 2015/0163133 A1 | 6/2015 | Grosser et al. | |
| 2015/0188731 A1 * | 7/2015 | Daly | H04L 41/12 709/224 |
| 2015/0295861 A1 * | 10/2015 | Dai | H04L 1/0001 370/218 |
| 2016/0065477 A1 * | 3/2016 | White | H04L 47/125 370/237 |
| 2017/0048144 A1 * | 2/2017 | Liu | H04L 47/122 |
| 2017/0085485 A1 * | 3/2017 | Vanini | H04L 47/125 |
| 2017/0134287 A1 * | 5/2017 | Shaw | H04L 47/125 |
| 2018/0302152 A1 * | 10/2018 | Shikhmanter | H04Q 11/0066 |

OTHER PUBLICATIONS

K. Lougheed et al, A Border Gateway Protocol (BGP), Network WorkingGroup, rfc1163, Jun. 1990, 29 pages.
K. Lougheed et al, A Border Gateway Protocol 3 (BGP-3). Network Working Group, rtc1267, Oct. 1991, 35 pages.
Y. Rekhter, Ed. Et al, A Border Gateway Protocol 4 (BGP-4). Network Working Group, rfc4271, Jan. 2006, 104 pages.
T. Bates et al, Multiprotocol Extensions for BGP-4, Network Working Group, rfc4760, Jan. 2007, 12 pages.

* cited by examiner

METHOD AND APPARATUS FOR IMPLEMENTING LOAD SHARING

CROSS-REFERENCE TO RELATED APPLICATIONS

This application is a continuation of International Application No. PCT/CN2016/106942, filed on Nov. 23, 2016, which claims priority to Chinese Patent Application No. 201510843538.3, filed on Nov. 26, 2015. Both of the aforementioned applications are hereby incorporated by reference in their entireties.

TECHNICAL FIELD

The present disclosure relates to the field of communications technologies, and in particular, to a method and an apparatus for implementing load sharing.

BACKGROUND

In a network environment, a packet needs to be forwarded from a source node to a destination node along a forwarding path, so that a data packet is forwarded, and data is transmitted. The source node is also referred to as an ingress node (Ingress Node), and the destination node is also referred to as an egress node (Egress Node). In a mechanism of using a label to forward a packet, such as a multiprotocol label switching (MPLS) mechanism or a segment routing mechanism, the forwarding path is also referred to as a label switched path (LSP). For a network environment in which multiple links reach a same destination address, if a conventional routing technology is used, a packet sent to the destination address occupies one of the links, and the other links are in a standby state or an invalid state. Some links on a forwarding node are congested because excessive packets need to be sent, and remaining links on the forwarding node are in an idle state.

By using an equal-cost multipath (ECMP) technology, a packet flow may be forwarded on a source node by using a non-congested link, but a packet flow cannot be forwarded on another forwarding node by using a non-congested link, that is, load imbalance cannot be resolved by using the ECMP technology.

SUMMARY

Embodiments described in the present disclosure provide a method and an apparatus for implementing load sharing, so that all links for forwarding a packet flow are non-congested links, and load imbalance is resolved.

According to a first aspect, an embodiment of the present disclosure provides a method for implementing load sharing, and the method includes:

selecting, by a network device, a packet flow forwarded by using a first link, where the first link is a link in a congested state on a first forwarding node;

selecting, by the network device, a second link that may be used to forward the packet flow, where the second link is a link that is not in a congested state after available bandwidth of the link is occupied by the packet flow, and the second link is a link between the first forwarding node and a second forwarding node;

selecting, by the network device, a first hash gene corresponding to the second link;

determining, by the network device, that a third link is not in a congested state after available bandwidth of the third link is occupied by the packet flow, where the third link is a link that is on the second forwarding node and that corresponds to the first hash gene, and the third link is a link between the second forwarding node and a third forwarding node; and saving, by the network device, the first hash gene in a source node of the packet flow.

Optionally, after the selecting, by the network device, a first hash gene corresponding to the second link, the method further includes:

determining, by the network device, that the third link is in a congested state after the available bandwidth of the third link is occupied by the packet flow, and selecting a second hash gene corresponding to the second link;

determining, by the network device, that a fourth link is not in a congested state after available bandwidth of the fourth link is occupied by the packet flow, where the fourth link is a link that is on the second forwarding node and that corresponds to the second hash gene, and the fourth link is a link between the second forwarding node and a fourth forwarding node; and saving, by the network device, the second hash gene in the source node of the packet flow.

Optionally, after the determining, by the network device, that a third link is not in a congested state after available bandwidth of the third link is occupied by the packet flow, the method further includes:

determining, by the network device, that a fifth link is not in a congested state after available bandwidth of the fifth link is occupied by the packet flow, and performing the step of saving the first hash gene in a source node of the packet flow, where the fifth link is a link that is on the third forwarding node and that corresponds to the first hash gene, and the fifth link is a link between the third forwarding node and a fifth forwarding node.

Optionally, after the determining, by the network device, that a third link is not in a congested state after available bandwidth of the third link is occupied by the packet flow, the method further includes:

determining, by the network device, that the fifth link is in a congested state after the available bandwidth of the fifth link is occupied by the packet flow, and selecting a third hash gene corresponding to the second link;

determining, by the network device, that a sixth link is not in a congested state after available bandwidth of the sixth link is occupied by the packet flow and that a seventh link is not in a congested state after available bandwidth of the seventh link is occupied by the packet flow, where the sixth link is a link that is on the second forwarding node and that corresponds to the third hash gene, the sixth link is a link between the second forwarding node and a sixth forwarding node, the seventh link is a link that is on the sixth forwarding node and that corresponds to the third hash gene, and the seventh link is a link between the sixth forwarding node and a seventh forwarding node; and saving, by the network device, the third hash gene in the source node of the packet flow.

Optionally, after the selecting, by the network device, a first hash gene corresponding to the second link, the method further includes:

determining, by the network device, that the third link is in a congested state after the available bandwidth of the third link is occupied by the packet flow, and selecting an eighth link that may be used to forward the packet flow, where the eighth link is a link that is not in a congested state after available bandwidth of the link is occupied by the packet flow, and the eighth link is a link between the first forwarding node and an eighth forwarding node;

selecting, by the network device, a fourth hash gene corresponding to the eighth link;

determining, by the network device, that a ninth link is not in a congested state after available bandwidth of the ninth link is occupied by the packet flow, where the ninth link is a link that is on the eighth forwarding node and that corresponds to the fourth hash gene, and the ninth link is a link between the eighth forwarding node and a ninth forwarding node; and saving, by the network device, the fourth hash gene in the source node of the packet flow.

Optionally, the determining, by the network device, that a third link is not in a congested state after available bandwidth of the third link is occupied by the first packet flow includes:

determining, by the network device according to the first hash gene, that the packet flow is forwarded by using the third link, where the third link is specifically a link corresponding to a result obtained by calculating the first hash gene by using a hash algorithm of the second forwarding node; and determining, by the network device according to bandwidth occupied by the packet flow and total bandwidth and used bandwidth of the third link, that the third link is not in a congested state after the available bandwidth of the third link is occupied by the packet flow.

According to a second aspect, an embodiment of the present disclosure provides an apparatus for implementing load sharing, and the apparatus includes:

a first selection unit, configured to select a packet flow forwarded by using a first link, where the first link is a link in a congested state on a first forwarding node;

a second selection unit, configured to select a second link that may be used to forward the packet flow, where the second link is a link that is not in a congested state after available bandwidth of the link is occupied by the packet flow, and the second link is a link between the first forwarding node and a second forwarding node;

a third selection unit, configured to select a first hash gene corresponding to the second link;

a first determining unit, configured to determine that a third link is not in a congested state after available bandwidth of the third link is occupied by the packet flow, where the third link is a link that is on the second forwarding node and that corresponds to the first hash gene, and the third link is a link between the second forwarding node and a third forwarding node; and a first saving unit, configured to save the first hash gene in a source node of the packet flow.

Optionally, the apparatus further includes:

a second determining unit, configured to: after the third selection module selects the first hash gene, determine that the third link is in a congested state after the available bandwidth of the third link is occupied by the packet flow;

a fourth selection unit, configured to select a second hash gene corresponding to the second link;

a fifth determining unit, configured to determine that a fourth link is not in a congested state after available bandwidth of the fourth link is occupied by the packet flow, where the fourth link is a link that is on the second forwarding node and that corresponds to the second hash gene, and the fourth link is a link between the second forwarding node and a fourth forwarding node; and a second saving unit, configured to save the second hash gene in the source node of the packet flow.

Optionally, the apparatus further includes:

a sixth determining unit, configured to: after the first determining unit determines that the third link is not in a congested state after the available bandwidth of the third link is occupied by the packet flow, determine that a fifth link is not in a congested state after available bandwidth of the fifth link is occupied by the packet flow, where the fifth link is a link that is on the third forwarding node and that corresponds to the first hash gene, and the fifth link is a link between the third forwarding node and a fifth forwarding node; and a triggering unit, configured to trigger the first saving unit to save the first hash gene in the source node of the packet flow.

Optionally, the apparatus further includes:

a seventh determining unit, configured to: after the first determining unit determines that the third link is not in a congested state after the available bandwidth of the third link is occupied by the packet flow, determine that the fifth link is in a congested state after the available bandwidth of the fifth link is occupied by the packet flow;

a fifth selection unit, configured to select a third hash gene corresponding to the second link;

an eighth determining unit, configured to determine that a sixth link is not in a congested state after available bandwidth of the sixth link is occupied by the packet flow and that a seventh link is not in a congested state after available bandwidth of the seventh link is occupied by the packet flow, where the sixth link is a link that is on the second forwarding node and that corresponds to the third hash gene, the sixth link is a link between the second forwarding node and a sixth forwarding node, the seventh link is a link that is on the sixth forwarding node and that corresponds to the third hash gene, and the seventh link is a link between the sixth forwarding node and a seventh forwarding node; and a third saving unit, configured to save the third hash gene in the source node of the packet flow.

Optionally, the apparatus further includes:

a second determining unit, configured to: after the first selection unit selects the first hash gene, determine that the third link is in a congested state after the available bandwidth of the third link is occupied by the packet flow;

a sixth selection unit, configured to select an eighth link that may be used to forward the packet flow, where the eighth link is a link that is not in a congested state after available bandwidth of the link is occupied by the packet flow, and the eighth link is a link between the first forwarding node and an eighth forwarding node;

a seventh selection unit, configured to select a fourth hash gene corresponding to the eighth link;

a ninth determining unit, configured to determine that a ninth link is not in a congested state after available bandwidth of the ninth link is occupied by the packet flow, where the ninth link is a link that is on the eighth forwarding node and that corresponds to the fourth hash gene, and the ninth link is a link between the eighth forwarding node and a ninth forwarding node; and a fourth saving unit, configured to save the fourth hash gene in the source node of the packet flow.

Optionally, the first determining unit is further specifically configured to:

determine, according to the first hash gene, that the packet flow is forwarded by using the third link, where the third link is specifically a link corresponding to a result obtained by calculating the first hash gene by using a hash algorithm of the second forwarding node; and determine, according to bandwidth occupied by the packet flow and total bandwidth and used bandwidth of the third link, that the third link is not in a congested state after the available bandwidth of the third link is occupied by the packet flow.

According to a third aspect, an embodiment of the present disclosure provides a network device. The network device includes a processor and a memory.

The memory is configured to store a program instruction and data.

The processor is configured to read the instruction and the data that are stored in the memory, to perform the following operations:

selecting a packet flow forwarded by using a first link, where the first link is a link in a congested state on a first forwarding node;

selecting a second link that may be used to forward the packet flow, where the second link is a link that is not in a congested state after available bandwidth of the link is occupied by the packet flow, and the second link is a link between the first forwarding node and a second forwarding node;

selecting a first hash gene corresponding to the second link;

determining that a third link is not in a congested state after available bandwidth of the third link is occupied by the packet flow, where the third link is a link that is on the second forwarding node and that corresponds to the first hash gene, and the third link is a link between the second forwarding node and a third forwarding node; and saving the first hash gene in a source node of the packet flow.

Optionally, after selecting the first hash gene corresponding to the second link, the processor further performs the following operations:

determining that the third link is in a congested state after the available bandwidth of the third link is occupied by the packet flow, and selecting a second hash gene corresponding to the second link;

determining that a fourth link is not in a congested state after available bandwidth of the fourth link is occupied by the packet flow, where the fourth link is a link that is on the second forwarding node and that corresponds to the second hash gene, and the fourth link is a link between the second forwarding node and a fourth forwarding node; and saving the second hash gene in the source node of the packet flow.

Optionally, after determining that the third link is not in a congested state after the available bandwidth of the third link is occupied by the packet flow, the processor further performs the following operations:

determining that a fifth link is not in a congested state after available bandwidth of the fifth link is occupied by the packet flow, and performing the step of saving the first hash gene in a source node of the packet flow, where the fifth link is a link that is on the third forwarding node and that corresponds to the first hash gene, and the fifth link is a link between the third forwarding node and a fifth forwarding node.

Optionally, after determining that the third link is not in a congested state after the available bandwidth of the third link is occupied by the packet flow, the processor further performs the following operations:

determining that the fifth link is in a congested state after the available bandwidth of the fifth link is occupied by the packet flow;

selecting a third hash gene corresponding to the second link;

determining that a sixth link is not in a congested state after available bandwidth of the sixth link is occupied by the packet flow and that a seventh link is not in a congested state after available bandwidth of the seventh link is occupied by the packet flow, where the sixth link is a link that is on the second forwarding node and that corresponds to the third hash gene, the sixth link is a link between the second forwarding node and a sixth forwarding node, the seventh link is a link that is on the sixth forwarding node and that corresponds to the third hash gene, and the seventh link is a link between the sixth forwarding node and a seventh forwarding node; and saving the third hash gene in the source node of the packet flow.

Optionally, after selecting the first hash gene corresponding to the second link, the processor further performs the following operations:

determining that the third link is in a congested state after the available bandwidth of the third link is occupied by the packet flow, and selecting an eighth link that may be used to forward the packet flow, where the eighth link is a link that is not in a congested state after available bandwidth of the link is occupied by the packet flow, and the eighth link is a link between the first forwarding node and an eighth forwarding node;

selecting a fourth hash gene corresponding to the eighth link;

determining that a ninth link is not in a congested state after available bandwidth of the ninth link is occupied by the packet flow, where the ninth link is a link that is on the eighth forwarding node and that corresponds to the fourth hash gene, and the ninth link is a link between the eighth forwarding node and a ninth forwarding node; and saving the fourth hash gene in the source node of the packet flow.

Optionally, to determine that the third link is not in a congested state after the available bandwidth of the third link is occupied by the first packet flow, the processor performs the following operations:

determining, according to the first hash gene, that the packet flow is forwarded by using the third link, where the third link is specifically a link corresponding to a result obtained by calculating the first hash gene by using a hash algorithm of the second forwarding node; and determining, according to bandwidth occupied by the packet flow and total bandwidth and used bandwidth of the third link, that the third link is not in a congested state after the available bandwidth of the third link is occupied by the packet flow.

According to the technical solutions provided in the embodiments described in the present disclosure, if the first link on the first forwarding node is in a congested state, the network device selects the packet flow forwarded by using the first link. The network device selects the second link and the first hash gene corresponding to the second link for the packet flow, and the second link is a link that is not in a congested state after the available bandwidth of the link is occupied by the packet flow. The network device verifies the first hash gene, and determines that the third link is not in a congested state after the available bandwidth of the third link is occupied by the packet flow. After verifying the first hash gene, the network device saves the first hash gene in the source node that forwards the packet flow. The source node may encapsulate the first hash gene in the packet flow, and forward, by using the second link and the third link, the packet flow encapsulated with the first hash gene. In this way, after verifying that multiple links such as the second link and the third link through which the packet flow forwarded by using the first link passes are not congested, the network device saves the first hash gene in the source node that forwards the packet flow. The packet flow can be forwarded on multiple forwarding nodes other than the source node by using a non-congested link, so that a congested state of the congested first link is relieved, and relatively balanced load sharing is implemented.

BRIEF DESCRIPTION OF DRAWINGS

To describe the technical solutions in the embodiments described in the present disclosure more clearly, the following briefly describes the accompanying drawings required for describing the embodiments or the prior art. Apparently, the accompanying drawings in the following description show merely some embodiments recorded in the present application, and persons of ordinary skill in the art may still derive other drawings from these accompanying drawings.

DESCRIPTION OF EMBODIMENTS

To make persons skilled in the art understand the technical solutions in the present disclosure better, the following clearly describes the technical solutions in the embodiments described in the present disclosure with reference to the accompanying drawings in the embodiments described in the present disclosure. Apparently, the described embodiments are merely a part rather than all of the embodiments described in the present disclosure.

In a common network environment, a source node configured to forward a packet flow may select a corresponding hash gene for the packet flow according to a load status of a link of the source node. The source node adds the hash gene to the packet flow. The source node performs hash calculation on the hash gene, to obtain a hash calculation result. Because the source node determines the hash gene according to the load status of the link of the source node, a link that is on the source node and that corresponds to the hash calculation result is in a non-congested state. That is, the packet flow to which the hash gene is added may be sent to another forwarding node by using the non-congested link on the source node. Another forwarding node may obtain a hash calculation result according to the hash gene in the packet flow. A link that is on the another forwarding node and that corresponds to the hash calculation result may be in a congested state. In a common network environment, in a method for implementing load sharing, it cannot be ensured that a link through which the packet flow to which the hash gene is added passes and that is on each forwarding node is in a non-congested state.

To implement relatively balanced load sharing, embodiments described in the present disclosure provide a method and an apparatus for implementing load sharing. After selecting a hash gene for a packet flow, a network device verifies whether multiple links through which the packet flow encapsulated with the hash gene passes are congested. If the network device determines that the multiple links through which the packet flow encapsulated with the hash gene passes are not congested, the network device saves the hash gene in a source node configured to forward the packet flow. After the source node encapsulates the hash gene in the packet flow, the packet flow encapsulated with the hash gene can be forwarded by using non-congested links on multiple forwarding nodes, and the multiple forwarding nodes include forwarding nodes except the source node. The multiple forwarding nodes may further include the source node.

Figure 1:
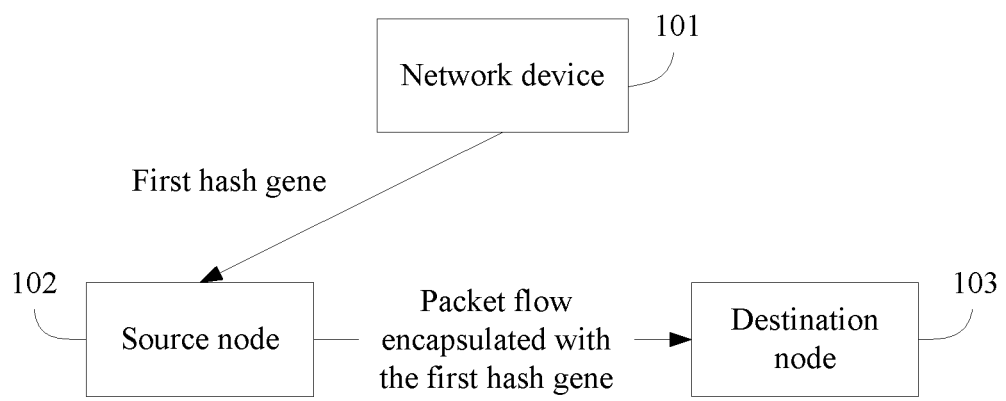
FIG. 1 is a schematic diagram of a system framework related to an application scenario according to an embodiment of the present disclosure.

For example, one of application scenarios of implementations in accordance with the present disclosure may be applied to a network system shown in FIG. 1. In the network system, for a first link in a congested state on a first forwarding node, a network device 101 selects a packet flow forwarded by using the first link, and selects a second link that may be used to forward the packet flow. The second link is a link that is not in a congested state after available bandwidth of the link is occupied by the packet flow, and the second link is a link between the first forwarding node and a second forwarding node. The network device 101 selects a first hash gene corresponding to the second link, and determines that a third link is not in a congested state after available bandwidth of the third link is occupied by the packet flow. The third link is a link that is on the second forwarding node and that corresponds to the first hash gene, and the third link is a link between the second forwarding node and a third forwarding node. After determining that the third link is not in a congested state after the available bandwidth of the third link is occupied by the packet flow, the network device 101 saves the first hash gene in a source node 102 of the packet flow. If the source node 102 receives the packet flow, the source node 102 encapsulates the first hash gene in the packet flow, and then forwards the packet flow encapsulated with the first hash gene to a destination node 103.

In the application scenario shown in FIG. 1, if the network device 101 is the source node 102, that the network device 101 saves the first hash gene in the source node 102 is equivalent to that the source node 102 saves the first hash gene in the source node 102. If the network device 101 is another network device other than the source node 102, that the network device 101 saves the first hash gene in the source node 102 is equivalent to that the network device 101 sends the first hash gene to the source node 102 and the source node 102 saves the first hash gene. The network device 101 may be a controller in a network, such as an software defined networking (SDN) controller.

It should be noted that the foregoing application scenario is shown only for understanding principles of the present disclosure, but is not intended to limit the technical solutions provided in the embodiments of present disclosure.

Implementations of a method and an apparatus for implementing load sharing in the present disclosure are described in detail below with reference to the accompanying drawings and by using embodiments.

Figure 2A:
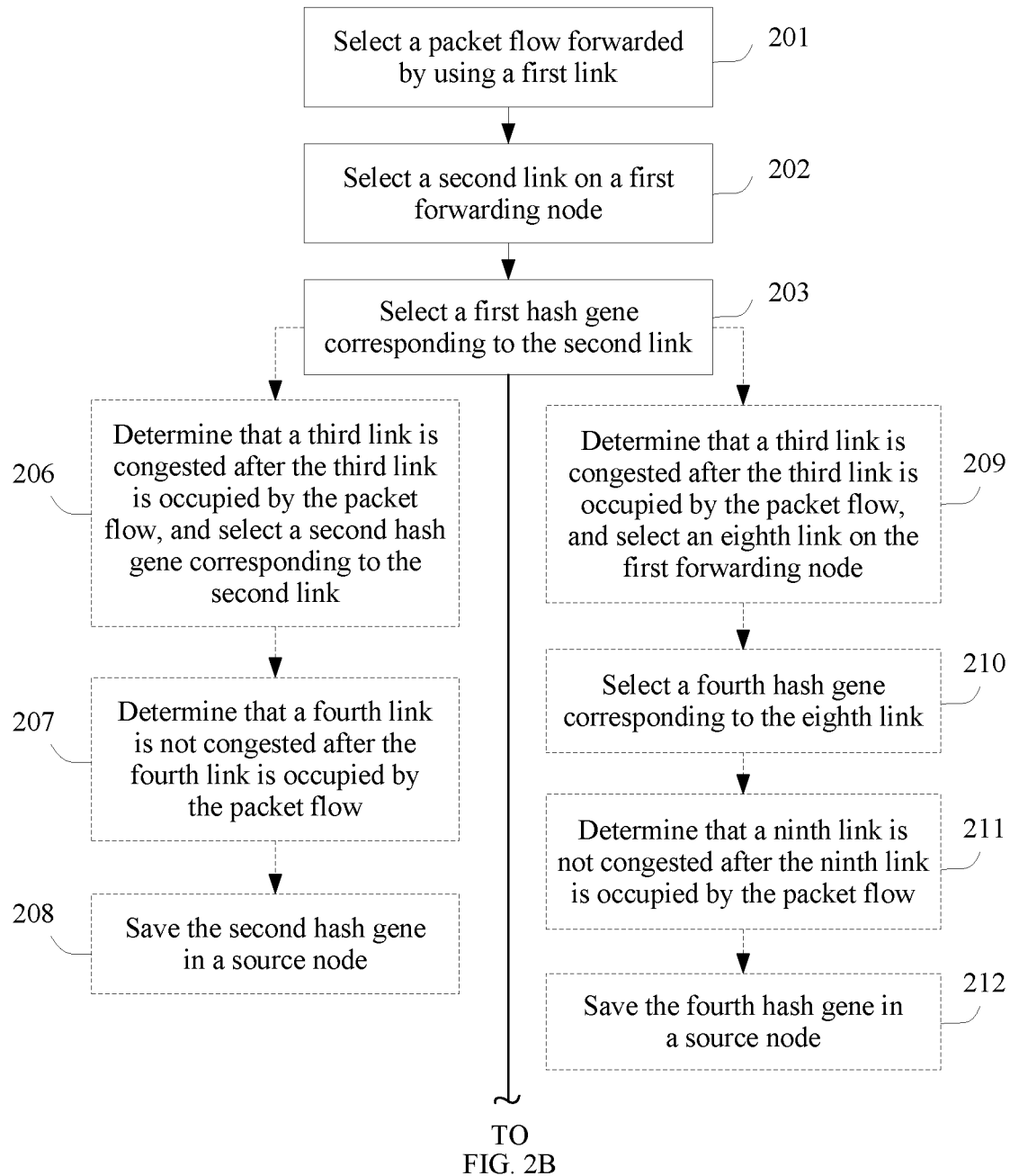
FIG. 2A and FIG. 2B are a schematic flowchart of a method for implementing load sharing according to an embodiment of the present disclosure.
Figure 2B:
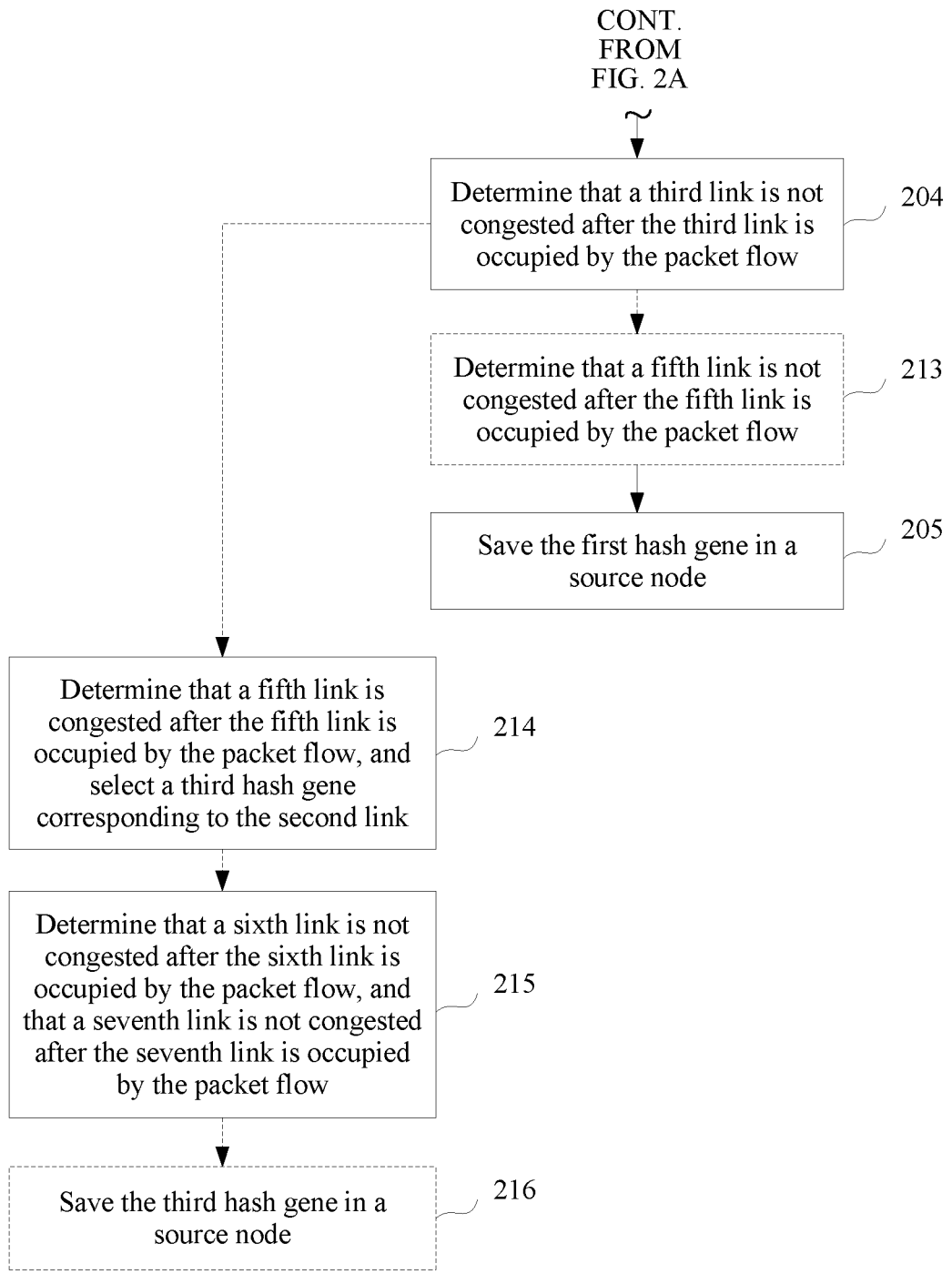

FIG. 2A and FIG. 2B are a schematic flowchart of a method for implementing load sharing according to an embodiment of the present disclosure. In this embodiment, for example, the method may include the following content.

S201. A network device selects a packet flow forwarded by using a first link, where the first link is a link in a congested state on a first forwarding node.

In one embodiment, the network device may obtain load statuses of links in a network, and may determine whether the links are in a congested state based on the load statuses of the links. If the network device determines that the first link is in a congested state, the network device determines that load of the first link needs to be shared to another link. In this case, the network device may select the packet flow forwarded by using the first link. The packet flow is a candidate packet flow that needs to be adjusted from the first link to another link. For the candidate packet flow, the network device first determines that, after the candidate packet flow is adjusted, the candidate packet flow can be forwarded by using a link in a non-congested state; and then adjusts a forwarding path of the candidate packet flow, so that the candidate packet flow is adjusted from the first link to another link for forwarding. After the forwarding path of the candidate packet flow is adjusted, load traffic forwarded on the first link is reduced, a congested state of the first link is relived, and adjustment of the forwarding link of the candidate packet flow does not cause generation of a new congested link in the network.

In this embodiment, the packet flow represents a group of packets, and the group of packets has a same forwarding path in the network. The group of packets passes through a same forwarding node during forwarding in the network. For example, the packet flow may be a group of packets whose destination addresses have a same prefix.

In this embodiment, multiple implementations may be used by the network device to determine whether the first link is in a congested state. For example, the network device may determine, by using available bandwidth of the first link, whether the first link is in a congested state. Specifically, the network device obtains the available bandwidth of the first link. If the network device determines that the available bandwidth of the first link is less than a preset available bandwidth threshold, the network device determines that the first link is in a congested state. For another example, the network device may determine, by using occupied bandwidth of the first link, whether the first link is in a congested state. Specifically, the network device obtains the occupied bandwidth of the first link. If the network device determines that the occupied bandwidth of the first link is greater than a preset occupied bandwidth threshold, the network device determines that the first link is in a congested state. For still another example, the network device may determine, by using a bandwidth usage ratio of the first link, whether the first link is in a congested state. The bandwidth usage ratio of the first link represents a ratio of occupied bandwidth of the first link to total bandwidth of the first link. Specifically, the network device obtains the total bandwidth and the occupied bandwidth of the first link, and calculates the bandwidth usage ratio of the first link according to the total bandwidth of the first link and the occupied bandwidth of the first link. If the network device determines that the bandwidth usage ratio of the first link is greater than a preset bandwidth usage ratio threshold, the network device determines that the first link is in a congested state.

In this embodiment, the packet flow may be any packet flow forwarded by using the first link. For example, the network device may randomly select the packet flow from all packet flows forwarded by using the first link. For another example, the network device may select the packet flow according to bandwidth usage of the first link and statuses of occupied bandwidth of packet flows, so that the first link can be in a non-congested state when the packet flow does not occupy bandwidth of the first link. Specifically, the network device calculates exceeded bandwidth by which occupied bandwidth of the first link exceeds a bandwidth threshold corresponding to the congested state, separately compares occupied bandwidth of each packet flow forwarded by using the first link with the exceeded bandwidth, and selects the packet flow whose occupied bandwidth exceeds the exceeded bandwidth.

S202. The network device selects a second link that may be used to forward the packet flow, where the second link is a link that is not in a congested state after available bandwidth of the link is occupied by the packet flow, and the second link is a link between the first forwarding node and a second forwarding node.

In one embodiment, for the selected packet flow, the network device may determine another link that is on the first forwarding node other than the first link and that may be used to forward the packet flow, and select, as the second link from the another link, a link that is not in a congested state after available bandwidth of the link is occupied by the packet flow.

The second link is a candidate link used to forward the packet flow after a forwarding path of the packet flow is adjusted. For the candidate link, the network device first determines that, after the packet flow is adjusted to the candidate link, another link used to forward the packet flow is also in a non-congested state; and then adjusts the forwarding path of the packet flow, so that the packet flow is adjusted from the first link to another candidate link for forwarding.

The second link needs to meet the following condition: The second link is not in a congested state after the available bandwidth of the second link is occupied by the packet flow. In this embodiment, multiple implementations may be used by the network device to determine whether the second link is in a congested state after the available bandwidth of the second link is occupied by the packet flow. For example, the network device may determine, according to available bandwidth remained after the available bandwidth of the second link is occupied by the packet flow, whether the second link is in a congested state after the available bandwidth of the second link is occupied by the packet flow. Specifically, the network device obtains the available bandwidth of the second link and bandwidth occupied by the packet flow, and calculates a difference between the available bandwidth of the second link and the bandwidth occupied by the packet flow. If the network device determines that the difference between the available bandwidth of the second link and the bandwidth occupied by the packet flow is greater than a preset available bandwidth threshold, the network device determines that the second link is not in a congested state after the available bandwidth of the second link is occupied by the packet flow. For another example, the network device may determine, according to a bandwidth usage ratio obtained after the available bandwidth of the second link is occupied by the packet flow, whether the second link is in a congested state after the available bandwidth of the second link is occupied by the packet flow. Specifically, the network device obtains occupied bandwidth and total bandwidth of the second link and the bandwidth occupied by the packet flow, calculates a sum of the occupied bandwidth of the second link and the bandwidth occupied by the packet flow, and calculates, by using the sum and the total bandwidth of the second link, the bandwidth usage ratio obtained after the available bandwidth of the second link is occupied by the packet flow. If the network device determines that the bandwidth usage ratio obtained after the available bandwidth of the second link is occupied by the packet flow is less than a preset bandwidth usage ratio threshold, the network device determines that the second link is not in a congested state after the available bandwidth of the second link is occupied by the packet flow.

In addition to the first link, there may be multiple other links that are connected on the first forwarding node and that may be used to forward the packet flow. The other links are not in a congested state after available bandwidth of the other links is occupied by the packet flow. The packet flow can be finally forwarded to a destination node of the packet flow after being forwarded by using any link in the other links. For example, the network device may select the second link from the multiple other links that may be used to forward the packet flow. For example, the network device may randomly select the second link from the multiple other links that may be used to forward the packet flow. For another example, the network device may select a link that has highest available bandwidth or a link that has a smallest bandwidth usage ratio from the multiple other links that may be used to forward the packet flow, and use the selected link as the second link.

S203. The network device selects a first hash gene corresponding to the second link.

The first hash gene is a hash gene that is on the first forwarding node and that corresponds to the second link, that is, a result obtained by calculating the first hash gene by using a hash algorithm used by the first forwarding node corresponds to the second link. If the first hash gene is encapsulated in the packet flow, the first forwarding node receives the packet flow encapsulated with the first hash gene, performs hash calculation on the first hash gene by using the hash algorithm used by the first forwarding node, to obtain a first calculation result, determines the second link according to the first calculation result, and forwards, by using the second link, the packet flow encapsulated with the first hash gene. In this way, the packet flow encapsulated with the first hash gene can be forwarded without using the first link any longer.

The first hash gene is a candidate hash gene used for adjusting the packet flow from the first link to the second link for forwarding. For the candidate hash gene, if the network device determines that the candidate hash gene is encapsulated in the packet flow, multiple links used to forward the packet flow are in a non-congested state, and the network device adjusts the forwarding path of the packet flow by using the candidate hash gene, so that the packet flow is adjusted from the first link to a link corresponding to the candidate hash gene for forwarding.

For example, in one embodiment in which the network device selects the first hash gene, the network device obtains a hash gene set that is on the first forwarding node and that corresponds to the second link, and selects the first hash gene from the hash gene set corresponding to the second link.

S204. The network device determines that a third link is not in a congested state after available bandwidth of the third link is occupied by the packet flow, where the third link is a link that is on the second forwarding node and that corresponds to the first hash gene, and the third link is a link between the second forwarding node and a third forwarding node.

In one embodiment, the network device determines, according to the first hash gene, that the packet flow is forwarded by using the third link. The third link is specifically a link corresponding to a result obtained by calculating the first hash gene by using a hash algorithm used by the second forwarding node. The network device determines, according to the bandwidth occupied by the packet flow, total bandwidth of the third link, and used bandwidth of the third link, that the third link is not in a congested state after the available bandwidth of the third link is occupied by the packet flow.

In this embodiment, multiple implementations may be used by the network device to determine that the packet flow is forwarded by using the third link. For example, the network device performs hash calculation on the first hash gene by using the hash algorithm used by the second forwarding node, to obtain a second calculation result, and determines the third link according to the second calculation result. Specifically, the network device determines, according to a network topology structure, that the packet flow encapsulated with the first hash gene reaches the second forwarding node after being forwarded by using the second link. The network device obtains the hash algorithm used by the second forwarding node, and performs hash calculation on the first hash gene by using the hash algorithm used by the second forwarding node, to obtain the second calculation result. The network device determines, according to the second calculation result, that the packet flow is forwarded by using the third link corresponding to the second calculation result. For another example, the network device finds the third link according to the first hash gene and a mapping table. The mapping table includes the first hash gene and a link that is in a correspondence with the first hash gene. Specifically, the network device determines, according to a network topology structure, that the packet flow encapsulated with the first hash gene reaches the second forwarding node after being forwarded by using the second link. The network device obtains a mapping table of the second forwarding node, and the mapping table of the second forwarding node records a correspondence between a link and a hash gene that are on the second forwarding node. The network device finds, in the mapping table, the third link corresponding to the first hash gene.

In this embodiment, multiple implementations may be used by the network device to determine whether the third link is in a congested state after the available bandwidth of the third link is occupied by the packet flow. For a specific determining method, refer to the method for determining whether the second link is in a congested state after the available bandwidth of the second link is occupied by the packet flow. Details are not described herein.

S205. The network device saves the first hash gene in a source node of the packet flow.

Optionally, after S205, the source node encapsulates the first hash gene in the packet flow, and forwards the packet flow encapsulated with the first hash gene. After the packet flow encapsulated with the first hash gene reaches the first forwarding node, the first forwarding node determines multiple links that are on the first forwarding node and that may be used to forward the packet flow encapsulated with the first hash gene. The first forwarding node performs hash calculation on the first hash gene by using the hash algorithm used by the first forwarding node, to obtain the first calculation result. The first forwarding node determines the second link corresponding to the first calculation result from the multiple links that are on the first forwarding node and that may be used to forward the packet flow encapsulated with the first hash gene. The first forwarding node forwards, by using the second link, the packet flow encapsulated with the first hash gene. After the packet flow encapsulated with the first hash gene reaches the second forwarding node, the second forwarding node determines multiple paths that are on the second forwarding node and that may be used to forward the packet flow encapsulated with the first hash gene. The second forwarding node performs hash calculation on the first hash gene by using the hash algorithm used by the second forwarding node, to obtain the second calculation result. The second forwarding node determines the third link corresponding to the second calculation result from the multiple paths that are on the second forwarding node and that may be used to forward the packet flow encapsulated with the first hash gene. The second forwarding node forwards, by using the third link, the packet flow encapsulated with the first hash gene. Therefore, the packet flow encapsulated with the first hash gene may be forwarded by using the second link and the third link that are not in a congested state, and is not forwarded by using the first link in a congested state any longer.

The first forwarding node may be any node other than the destination node on the forwarding path of the packet flow. For example, the first forwarding node may be the source node of the packet flow.

If the network device is a controller, the controller may deliver the first hash gene to the source node while delivering routing information corresponding to the packet flow to the source node. For example, the controller may add, by using an extended Border Gateway Protocol (BGP), the first hash gene and the routing information corresponding to the packet flow to network layer reachability information (NLRI) of the BGP, and sends the network layer reachability information to the source node.

If the third link is in a congested state after the available bandwidth of the third link is occupied by the packet flow, the network device may determine that the packet flow encapsulated with the first hash gene passes through a congested link. The network device may determine that the first hash gene is not applicable to adjustment of the forwarding path of the packet flow.

For example, if the network device determines that the first hash gene is not applicable, the network device may select another hash gene as a candidate hash gene used for adjusting the forwarding path of the packet flow. After S203, the method provided in this embodiment may further include S206, S207, and S208.

S206. The network device determines that a third link is in a congested state after available bandwidth of the third link is occupied by the packet flow, and selects a second hash gene corresponding to the second link.

For example, the second hash gene and the first hash gene are two different hash genes on the first forwarding node that are corresponding to the second link. A result obtained by calculating the second hash gene by using the hash algorithm used by the first forwarding node corresponds to the second link. The second hash gene may be used for adjusting the packet flow from the first link to the second link.

S207. The network device determines that a fourth link is not in a congested state after available bandwidth of the fourth link is occupied by the packet flow, where the fourth link is a link that is on the second forwarding node and that corresponds to the second hash gene, and the fourth link is a link between the second forwarding node and a fourth forwarding node.

In one embodiment, the network device determines, according to the second hash gene, that the packet flow is forwarded by using the fourth link. The fourth link is specifically a link corresponding to a result obtained by calculating the second hash gene by using a hash algorithm used by the second forwarding node. The network device determines, according to the bandwidth occupied by the packet flow, total bandwidth of the fourth link, and used bandwidth of the fourth link, that the fourth link is not in a congested state after the available bandwidth of the fourth link is occupied by the packet flow.

For one embodiment in which the network device determines that the packet flow is forwarded by using the fourth link, refer to the foregoing specific implementation in which the network device determines that the packet flow is forwarded by using the third link. Details are not described in this embodiment. In addition, for one embodiment in which the network device determines whether the fourth link is in a congested state after the available bandwidth of the fourth link is occupied by the packet flow, refer to the foregoing specific implementation in which the network device determines whether the third link is in a congested state after the available bandwidth of the third link is occupied by the packet flow. Details are not described in this embodiment either.

S208. The network device saves the second hash gene in a source node of the packet flow.

Optionally, after S208, the source node encapsulates the second hash gene in the packet flow, and forwards the packet flow encapsulated with the second hash gene.

For a processing manner in which a forwarding node in a network forwards the packet flow encapsulated with the second hash gene, refer to the foregoing processing manner in which the first forwarding node forwards the packet flow encapsulated with the first hash gene. Details are not described in this embodiment. In addition, if a controller is used as the network device, for one embodiment in which the controller delivers the second hash gene to the source node, refer to the foregoing specific implementation in which the controller delivers the first hash gene to the source node. Details are not described in this embodiment either.

For another example, if the network device determines that the first hash gene is not applicable, the network device may select, in addition to the first link and the second link, another link that is on the first forwarding node and that may be used to forward the packet flow, and then select, as a candidate hash gene, a hash gene corresponding to the another link that is on the first forwarding node and that may be used to forward the packet flow. Optionally, after S203, the method provided in this embodiment may further include S209 to S212.

S209. The network device determines that a third link is in a congested state after available bandwidth of the third link is occupied by the packet flow, and selects an eighth link that may be used to forward the packet flow, where the eighth link is a link that is not in a congested state after available bandwidth of the link is occupied by the packet flow, and the eighth link is a link between the first forwarding node and an eighth forwarding node.

The eighth link needs to meet the following selection condition: The eighth link is a link that is on the first forwarding node other than the first link and the second link and that may be used to forward the packet flow. The packet flow may be finally forwarded to the destination node of the packet flow after being forwarded by using the eighth link, and the eighth link is not in a congested state after the available bandwidth of the eighth link is occupied by the packet flow. For a method for selecting the eighth link by the network device, refer to the method for selecting the second link by the network device. Details are not described herein. For a method for determining whether the eighth link is in a congested state after the available bandwidth of the eighth link is occupied by the packet flow, refer to the foregoing method for determining whether the second link is in a congested state after the available bandwidth of the second link is occupied by the packet flow. Details are not described herein.

S210. The network device selects a fourth hash gene corresponding to the eighth link.

The fourth hash gene is a hash gene that is on the first forwarding node and that corresponds to the eighth link, and the first hash gene is a hash gene that is on the first forwarding node and that corresponds to the second link. That is, the first hash gene and the fourth hash gene are two different hash genes. A result obtained by calculating the fourth hash gene by using the hash algorithm used by the first forwarding node corresponds to the eighth link. The fourth hash gene may be used for adjusting the packet flow from the first link to the eighth link.

S211. The network device determines that a ninth link is not in a congested state after available bandwidth of the ninth link is occupied by the packet flow, where the ninth link is a link that is on the eighth forwarding node and that corresponds to the fourth hash gene, and the ninth link is a link between the eighth forwarding node and a ninth forwarding node.

In one embodiment, the network device determines, according to the fourth hash gene, that the packet flow is forwarded by using the ninth link. The ninth link is specifically a link corresponding to a result obtained by calculating the fourth hash gene by using a hash algorithm used by the fourth forwarding node. The network device determines, according to the bandwidth occupied by the packet flow, total bandwidth of the ninth link, and used bandwidth of the ninth link, that the ninth link is not in a congested state after the available bandwidth of the ninth link is occupied by the packet flow.

For one embodiment in which the network device determines that the packet flow is forwarded by using the ninth link, refer to the foregoing specific implementation in which the network device determines that the packet flow is forwarded by using the third link. Details are not described herein. In addition, for one embodiment in which the network device determines whether the ninth link is in a congested state after the available bandwidth of the ninth link is occupied by the packet flow, refer to the foregoing specific implementation in which the network device determines whether the third link is in a congested state after the available bandwidth of the third link is occupied by the packet flow. Details are not described herein either.

S212. The network device saves the fourth hash gene in a source node of the packet flow.

Optionally, after S212, the source node encapsulates the fourth hash gene in the packet flow, and forwards the packet flow encapsulated with the fourth hash gene. For a processing manner in which a forwarding node in a network forwards the packet flow encapsulated with the fourth hash gene, refer to the foregoing processing manner in which the first forwarding node forwards the packet flow encapsulated with the first hash gene. Details are not described herein. In addition, if a controller is used as the network device, for one embodiment in which the controller delivers the fourth hash gene to the source node, refer to the foregoing specific implementation in which the controller delivers the first hash gene to the source node. Details are not described herein either.

For another example, if the network device determines that the first hash gene is not applicable, the network device may reselect another packet flow, other than the packet flow selected in S201, that is forwarded by using the first link, then select another link that is on the first forwarding node other than the first link and that may be used to forward the another packet flow, and select a hash gene corresponding to the another link as a candidate hash gene. For a processing manner of reselecting a packet flow whose forwarding path needs to be adjusted, refer to S201 to S205. Details are not described in this embodiment.

After S204, the network device determines that a forwarding path of the packet flow encapsulated with the first hash gene includes at least two non-congested links, that is, the second link and the third link. To ensure as many non-congested links as possible in the forwarding path of the packet flow encapsulated with the first hash gene, the network device may further continue to verify whether a forwarding link that is of the packet flow encapsulated with the first hash gene and that is after the available bandwidth of the third link is in a congested state. After determining that the forwarding link after the available bandwidth of the third link is not in a congested state, the network device saves the first hash gene in the source node of the packet flow. Optionally, between S204 and S205, the method provided in this embodiment may further include S213.

S213. The network device determines that a fifth link is not in a congested state after available bandwidth of the fifth link is occupied by the packet flow, where the fifth link is a link that is on the third forwarding node and that corresponds to the first hash gene, and the fifth link is a link between the third forwarding node and a fifth forwarding node.

In one embodiment, the network device determines, according to the first hash gene, that the packet flow is forwarded by using the fifth link. The fifth link is specifically a link corresponding to a result obtained by calculating the first hash gene by using a hash algorithm used by the third forwarding node. The network device determines, according to the bandwidth occupied by the packet flow, total bandwidth of the fifth link, and used bandwidth of the fifth link, that the fifth link is not in a congested state after the available bandwidth of the fifth link is occupied by the packet flow.

For one embodiment in which the network device determines that the packet flow is forwarded by using the fifth link, refer to the foregoing specific implementation in which the network device determines that the packet flow is forwarded by using the third link. Details are not described in this embodiment. In addition, for one embodiment in which the network device determines whether the fifth link is in a congested state after the available bandwidth of the fifth link is occupied by the packet flow, refer to the foregoing specific implementation in which the network device determines whether the third link is in a congested state after the available bandwidth of the third link is occupied by the packet flow. Details are not described in this embodiment either.

Optionally, after S213, the network device may further continue to sequentially verify, in a manner for verifying the third link in S204 and a manner for verifying the fifth link in S213, whether forwarding links that are of the packet flow encapsulated with the first hash gene and that are after the available bandwidth of the fifth link are in a congested state. S205 is not performed until the network device determines that all links through which the packet flow encapsulated with the first hash gene passes from the first forwarding node to a destination node are not in a congested state, so that the first hash gene is saved in the source node of the packet flow. In this way, the network device adjusts the forwarding path of the packet flow, so that a congestion degree of the first link is reduced, and occupation of the packet flow does not cause congestion of the entire adjusted forwarding path of the packet flow. Therefore, a network load function is more balanced. If the fifth link is in a congested state after the available bandwidth of the fifth link is occupied by the packet flow, the network device may determine that the packet flow encapsulated with the first hash gene certainly passes through a congested link. The network device may determine that the first hash gene is not applicable to adjustment of the forwarding path of the packet flow. For example, if the network device determines, during verification of the fifth link, that the first hash gene is not applicable, the network device may select another hash gene, other than the first hash gene, that corresponds to the second link as a candidate hash gene. Specifically, after S204, this embodiment may further include S214 to S217.

S214. The network device determines that a fifth link is in a congested state after available bandwidth of the fifth link is occupied by the packet flow, and selects a third hash gene corresponding to the second link.

The third hash gene and the first hash gene are two different hash genes on the first forwarding node that are corresponding to the second link. A result obtained by calculating the third hash gene by using the hash algorithm used by the first forwarding node corresponds to the second link. The third hash gene may be used for adjusting the packet flow from the first link to the second link.

S215. The network device determines that a sixth link is not in a congested state after available bandwidth of the sixth link is occupied by the packet flow and that a seventh link is not in a congested state after available bandwidth of the seventh link is occupied by the packet flow, where the sixth link is a link that is on the second forwarding node and that corresponds to the third hash gene, the sixth link is a link between the second forwarding node and a sixth forwarding node, the seventh link is a link that is on the sixth forwarding node and that corresponds to the third hash gene, and the seventh link is a link between the sixth forwarding node and a seventh forwarding node.

In one embodiment, the network device determines, according to the third hash gene, that the packet flow encapsulated with the third hash gene is forwarded by using the sixth link and is forwarded by using the seventh link. The sixth link is specifically a link corresponding to a result obtained by calculating the third hash gene by using the hash algorithm used by the second forwarding node, and the seventh link is specifically a link corresponding to a result obtained by calculating the third hash gene by using a hash algorithm used by the sixth forwarding node. The network device determines, according to the bandwidth occupied by the packet flow, total bandwidth of the sixth link, and used bandwidth of the sixth link, that the sixth link is not in a congested state after the available bandwidth of the sixth link is occupied by the packet flow; and determines, according to the bandwidth occupied by the packet flow, total bandwidth of the seventh link, and used bandwidth of the seventh link, that the seventh link is not in a congested state after the available bandwidth of the seventh link is occupied by the packet flow.

For one embodiment in which the network device determines that the packet flow is forwarded by using the sixth link and the seventh link, refer to the foregoing specific implementation in which the network device determines that the packet flow is forwarded by using the third link. Details are not described in this embodiment. In addition, for one embodiment in which the network device separately determines whether the sixth link and the seventh link are in a congested state after the available bandwidth of the sixth link and the available bandwidth of the seventh link are occupied by the packet flow, refer to the foregoing specific implementation in which the network device determines whether the third link is in a congested state after the available bandwidth of the third link is occupied by the packet flow. Details are not described in this embodiment either.

S216. The network device saves the third hash gene in a source node of the packet flow.

Optionally, after S216, the source node encapsulates the third hash gene in the packet flow, and then forwards the packet flow encapsulated with the third hash gene.

For a processing manner in which a forwarding node in a network forwards the packet flow encapsulated with the third hash gene, refer to the foregoing processing manner in which the first forwarding node forwards the packet flow encapsulated with the first hash gene. Details are not described in this embodiment. In addition, if a controller is used as the network device, for one embodiment in which the controller delivers the third hash gene to the source node, refer to the foregoing specific implementation in which the controller delivers the first hash gene to the source node. Details are not described in this embodiment either.

In addition to the foregoing examples including S214 to S216, if the network device determines, during verification of the fifth link, that the first hash gene is not applicable, the network device may select another link that is on the first forwarding node other than the first link and the second link and that may be used to forward the packet flow, and then select, as a candidate hash gene, a hash gene corresponding to the another link that may be used to forward the packet flow. Alternatively, the network device may reselect another packet flow, other than the packet flow selected in S201, that is forwarded by using the first link, then select another link that is on the first forwarding node other than the first link and that may be used to forward the another packet flow, and select, as a candidate hash gene, a hash gene corresponding to the another link that may be used to forward the another packet flow. For a processing manner of reselecting a link that is on the first forwarding node and that is obtained after the packet flow is adjusted and a processing manner of reselecting a packet flow whose forwarding path needs to be adjusted, refer to S201 to S205. Details are not described in this embodiment.

Figure 3:
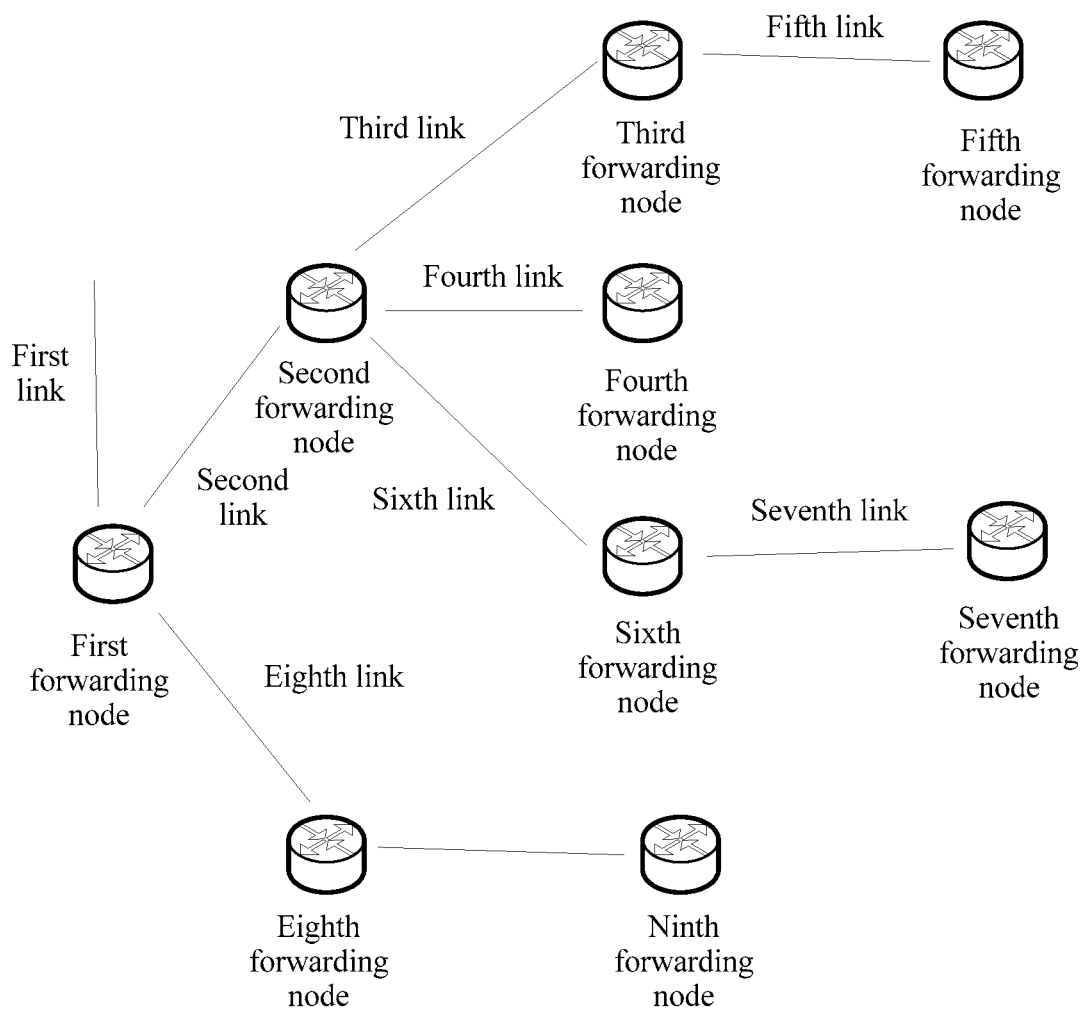
FIG. 3 is a schematic structural diagram of a network architecture according to an embodiment of the present disclosure.

As shown in FIG. 3, the third link and the fourth link are links on the second forwarding node that are corresponding to different hash genes. It may be learned that the third link and the fourth link may be a same link, or may be different links, that is, the third forwarding node and the fourth forwarding node may be a same node, or may be different nodes. Certainly, in S207 and S208, the network device determines that the third link is in a congested state after the available bandwidth of the third link is occupied by the packet flow and the fourth link is not in a congested state after the available bandwidth of the fourth link is occupied by the packet flow. In this case, the third link and the fourth link are certainly different links, and the third forwarding node and the fourth forwarding node are certainly different nodes.

As shown in FIG. 3, the third link and the sixth link are links on the second forwarding node that are corresponding to different hash genes. It may be learned that the third link and the sixth link may be a same link, or may be different links, that is, the third forwarding node and the sixth forwarding node may be a same node, or may be different nodes. When the third link and the sixth link are a same link, the sixth forwarding node is the third forwarding node, and the fifth link and the seventh link are links on the third forwarding node that are corresponding to different hash genes. In this case, the fifth link and the seventh link may be a same link, or may be different links, that is, the fifth forwarding node and the seventh forwarding node may be a same node, or may be different nodes. Certainly, in S215 and S216, the network device determines that the fifth link is in a congested state after the available bandwidth of the fifth link is occupied by the packet flow and the seventh link is not in a congested state after the available bandwidth of the seventh link is occupied by the packet flow. In this case, the fifth link and the seventh link are certainly different links, and the fifth forwarding node and the seventh forwarding node are certainly different nodes.

In addition, the second hash gene and the third hash gene are hash genes on the first forwarding node that are corresponding to the second link. The second hash gene and the third hash gene may be a same hash gene, or may be different hash genes. When the second hash gene and the third hash gene are a same hash gene, the fourth link and the sixth link are a same link. When the second hash gene and the third hash gene are different hash genes, the fourth link and the sixth link may be a same link, or may be different links.

This embodiment may be applied to multiple different network environments. In different network environments, hash genes may be different information in a packet flow. For example, this embodiment may be applied to a network environment in which a multiprotocol label switching (MPLS) technology is used. If the MPLS technology is used to forward a packet in the network environment, a hash gene is an MPLS label. For another example, this embodiment may be applied to a network environment in which a virtual extensible LAN (VXLAN) technology is used. If the VXLAN technology is used to forward a packet in the network environment, a hash gene is a port number of a source user datagram protocol (UDP). For still another example, this embodiment may be applied to a network environment in which a network virtualization using generic routing encapsulation (NVGRE) technology is used. If the NVGRE technology is used to forward a packet in the network environment, a hash gene is a flow identifier Flow ID.

According to the technical solution of this embodiment, for the first link in a congested state, the network device first selects the packet flow forwarded by using the first link and a hash gene that is used for adjusting the packet flow from the first link to another link, determines that the forwarding path of the packet flow includes at least two non-congested links when the hash gene is encapsulated in the packet flow, and then saves the hash gene in the source node of the packet flow. Therefore, after the source node encapsulates the hash gene in the packet flow, in the prior art, it can only be ensured that a forwarding path of the packet flow has a non-congested link on the source node, and by contrast, in this embodiment, it can be ensured that the forwarding path of the packet flow has at least two non-congested links, so that network load is more balanced.

Figure 4:
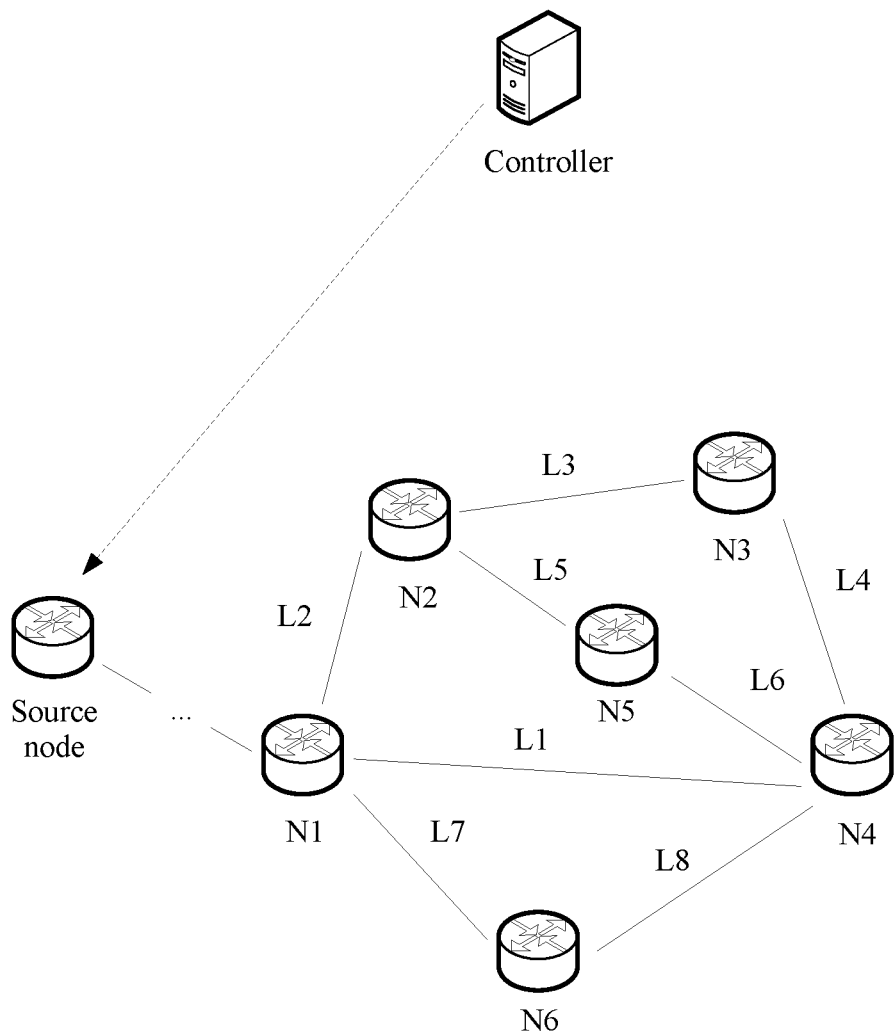
FIG. 4 is a schematic diagram of a partial network architecture related to an application scenario according to an embodiment of the present disclosure.

To enable persons skilled in the art to more clearly understand a specific application manner of this embodiment of the present disclosure, an example of an application scenario is used below to describe this embodiment of the present disclosure. FIG. 4 is a schematic diagram of a partial network architecture related to this application scenario. A controller is the network device in the foregoing embodiment of FIG. 2A and FIG. 2B, and is configured to control load sharing of an entire network. "N" represents a forwarding node, and "L" represents a link between forwarding nodes.

Figure 5A:
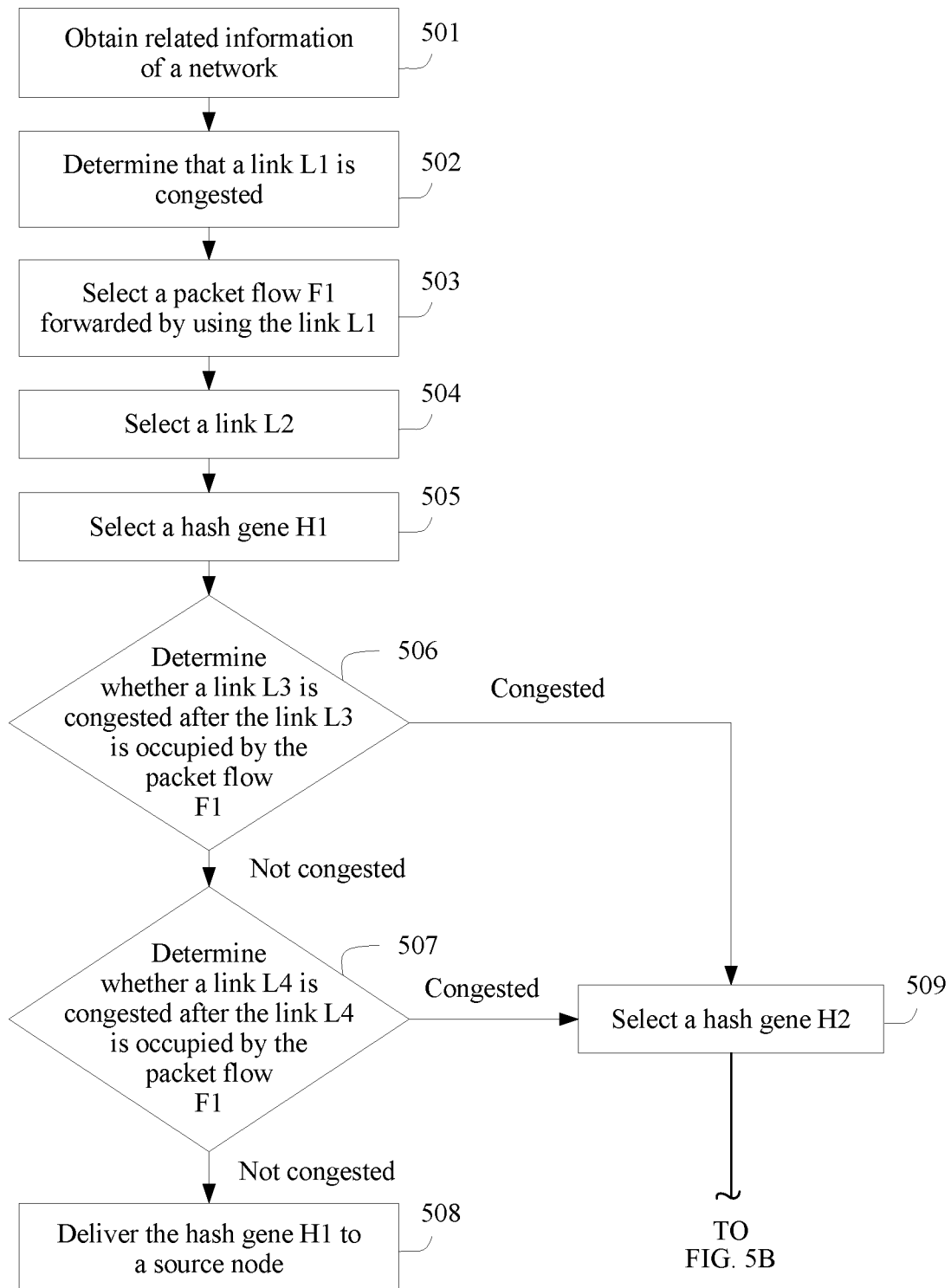
FIG. 5A and FIG. 5B are a schematic flowchart of a method for implementing load sharing according to an embodiment of the present disclosure.
Figure 5B:
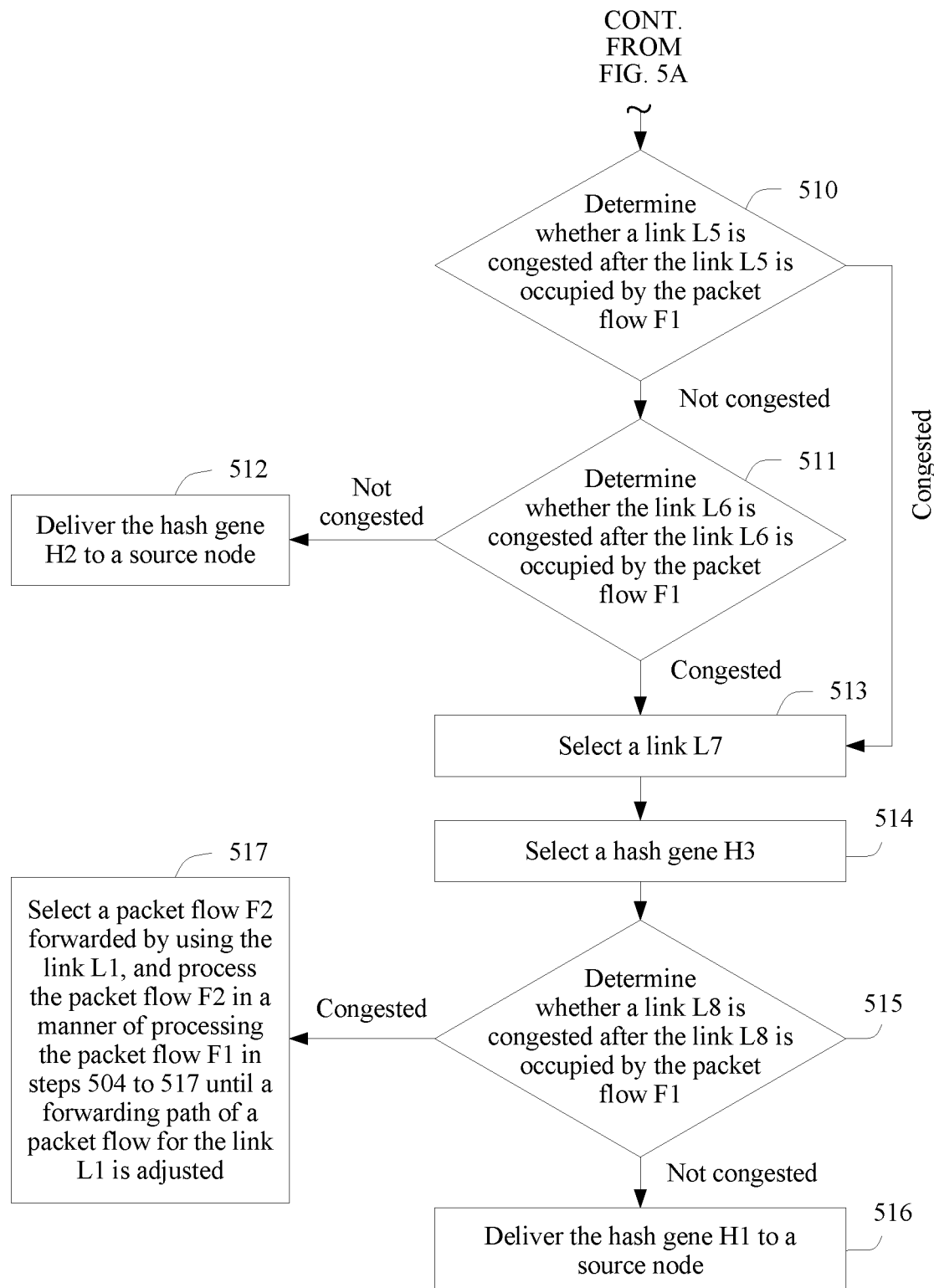

Specifically, FIG. 5A and FIG. 5B are a schematic flowchart of a method for implementing load sharing according to an embodiment of the present disclosure. This embodiment may be applied to the example of the application scenario. For example, the method may include the following content.

S501. A controller obtains topology information, load traffic information, and hash algorithm information of an entire network.

The topology information, the load traffic information, and the hash algorithm information may be used by the controller to select any congested link in the network, to select a packet flow that needs to be adjusted, and to select a hash gene that is applicable to adjusting the packet flow from the congested link to a non-congested link. The topology information represents a connection relationship between links and forwarding nodes in the network. The load traffic information includes total bandwidth of each link in the network, occupied bandwidth of each link in the network, and a packet flow forwarded on each link in the network. The hash algorithm information represents a hash algorithm of each forwarding node in the network, or a mapping table between a hash gene and a link on each forwarding node in the network.

S502. The controller determines, according to total bandwidth and occupied bandwidth of a link L1, that the link L1 is in a congested state.

Specifically, the controller may calculate a ratio of the occupied bandwidth of the link L1 to the total bandwidth of the link L1, and uses the ratio as a bandwidth usage ratio of the link L1. The controller determines whether the bandwidth usage ratio of the link L1 exceeds a preset bandwidth usage ratio threshold, and if the bandwidth usage ratio of the link L1 exceeds the preset bandwidth usage ratio threshold, the controller determines that the link L1 is in a congested state. The link L1 is equivalent to the first link in the embodiment of FIG. 2A and FIG. 2B.

S503. The controller selects a packet flow F1 forwarded by using the link L1.

The packet flow F1 may be any packet flow on the link L1. For example, the packet flow F1 may be a packet flow that is on the link L1 and that occupies highest bandwidth. For another example, the packet flow F1 may be a packet flow that enables the link L1 is not congested any longer if the packet flow does not occupy the link L1 any longer.

S504. The controller determines that both a link L2 and a link L7 on a forwarding node N1 can be used to forward the packet flow F1 and that the links are not in a congested state after available bandwidth of the links is occupied by the packet flow F1, and selects the link L2 from the link L2 and the link L7.

For example, the available bandwidth of the link L2 may be greater than the available bandwidth of the link L7, or a bandwidth usage ratio of the link L2 may be less than a bandwidth usage ratio of the link L7. That is, the controller may preferentially select a link that has highest available bandwidth or a link that has a smallest bandwidth usage ratio from the link L2 and the link L7.

The forwarding node N1 is equivalent to the first forwarding node in the foregoing embodiment of FIG. 2A and FIG. 2B. The link L2 is equivalent to the second link in the foregoing embodiment of FIG. 2A and FIG. 2B.

S505. The controller determines that hash genes on the forwarding node N1 that are corresponding to the link L2 include a hash gene H1 and a hash gene H2, and selects the hash gene H1 from the hash gene H1 and the hash gene H2.

For example, the hash gene H1 may be randomly selected by the controller from the two hash genes on the forwarding node N1 that are corresponding to the link L2.

The hash gene H1 selected in S505 is equivalent to the first hash gene in the foregoing embodiment of FIG. 2A and FIG. 2B.

S506. The controller determines that the packet flow F1 reaches a forwarding node N2 after being forwarded by using the link L2, determines, according to the hash gene H1, that the packet flow F1 encapsulated with the hash gene H1 is forwarded by using a link L3, and determines whether the link L3 is in a congested state after available bandwidth of the link L3 is occupied by the packet flow F1. If the link L3 is not in a congested state, S507 is performed; or if the link L3 is in a congested state, S509 is performed.

The controller may determine, according to the topology information of the network, that the packet flow F1 reaches the forwarding node N2 after being forwarded by using the link L2. The controller may determine, according to hash algorithm information used by the forwarding node N2, that the link L3 on the forwarding node N2 corresponds to the hash gene H1, that is, the packet flow F1 encapsulated with the hash gene H1 is to be forwarded by using the link L3. The controller may determine, according to the load traffic information of the network, total bandwidth of the link L3, occupied bandwidth of the link L3, and bandwidth occupied by the packet flow F1, calculates available bandwidth or a bandwidth usage ratio of the link L3 after the available bandwidth of the link L3 is occupied by the packet flow F1, and then determines, according to the calculated available bandwidth or bandwidth usage ratio, whether the link L3 is in a congested state after the available bandwidth of the link L3 is occupied by the packet flow F1.

The forwarding node N2 is equivalent to the second forwarding node in the foregoing embodiment of FIG. 2A and FIG. 2B. The link L3 is equivalent to the third link in the foregoing embodiment of FIG. 2A and FIG. 2B.

S507. The controller determines that the packet flow F1 encapsulated with the hash gene H1 reaches a forwarding node N3 after being forwarded by using the link L3, determines, according to the hash gene H1, that the packet flow F1 encapsulated with the hash gene H1 is to be forwarded by using a link L4, and determines whether the link L4 is in a congested state after available bandwidth of the link L4 is occupied by the packet flow F1. If the link L4 is not in a congested state, S508 is performed; or if the link L4 is in a congested state, S509 is performed.

For a process in which the controller determines the forwarding node N3, determines the link L4, and determines whether the link L4 is congested after the available bandwidth of the link L4 is occupied by the packet flow F1, refer to descriptions for the forwarding node N2 and the link L3 in S506. Details are not described herein.

The forwarding node N3 is equivalent to the third forwarding node in the embodiment of FIG. 2A and FIG. 2B. The link L4 is equivalent to the fifth link in the embodiment of FIG. 2A and FIG. 2B.

S508. The controller determines that the packet flow F1 encapsulated with the hash gene H1 reaches a forwarding node N4 after being forwarded by using the link L4, determines the forwarding node N4 as a destination node of the packet flow F1, and delivers the hash gene H1 to a source node of the packet flow F1.

The forwarding node N4 is equivalent to the fifth forwarding node in the foregoing embodiment of FIG. 2A and FIG. 2B.

In S508, when the forwarding node N4 is the destination node of the packet flow F1, the controller determines that if the hash gene H1 is encapsulated in the packet flow F1, all forwarding paths from the forwarding node N1 to the destination node are not congested. Therefore, the hash gene H1 is used to adjust a forwarding path of the packet flow F1, so that a congestion degree of the link L1 can be reduced, and no new congested link appears in the network after the packet flow F1 is adjusted.

S509. The controller selects the hash gene H2 that is on the forwarding node N1 and that corresponds to the link L2.

S510. The controller determines that the packet flow F1 encapsulated with the hash gene H2 reaches the forwarding node N2 after being forwarded by using the link L2, determines, according to the hash gene H2, that the packet flow F1 encapsulated with the hash gene H2 is to be forwarded by using a link L5, and determines whether the link L5 is in a congested state after available bandwidth of the link L5 is occupied by the packet flow F1. If the link L5 is not in a congested state, S511 is performed; or if the link L5 is in a congested state, S513 is performed.

For a process in which the controller determines the forwarding node N2, determines the link L5, and determines whether the link L5 is congested after the available bandwidth of the link L5 is occupied by the packet flow F1, refer to descriptions for the forwarding node N2 and the link L3 in S506. Details are not described in this embodiment.

S511. The controller determines that the packet flow F1 encapsulated with the hash gene H2 reaches a forwarding node N5 after being forwarded by using the link L5, determines, according to the hash gene H2, that the packet flow F1 encapsulated with the hash gene H2 is to be forwarded by using a link L6, and determines whether the link L6 is in a congested state after available bandwidth of the link L6 is occupied by the packet flow F1. If the link L6 is not in a congested state, S512 is performed; or if the link L6 is in a congested state, S513 is performed.

For a process in which the controller determines the forwarding node N5, determines the link L6, and determines whether the link L6 is congested after the available bandwidth of the link L6 is occupied by the packet flow F1, refer to descriptions for the forwarding node N2 and the link L3 in S506. Details are not described in this embodiment.

S512. The controller determines that the packet flow F1 encapsulated with the hash gene H2 reaches a forwarding node N4 after being forwarded by using the link L6, determines the forwarding node N4 as a destination node of the packet flow F1, and delivers the hash gene H2 to a source node of the packet flow F1.

In S512, when the forwarding node N4 is the destination node of the packet flow F1, the controller determines that if the hash gene H2 is encapsulated in the packet flow F1, all forwarding paths from the forwarding node N1 to the destination node are not congested. Therefore, the hash gene H2 is used to adjust a forwarding path of the packet flow F1, so that a congestion degree of the link L1 can be reduced, and no new congested link appears in the network after the packet flow F1 is adjusted.

If S509 is performed after S506 in which the controller determines that the link L3 is in a congested state after the available bandwidth of the link L3 is occupied by the packet flow F1, the hash gene H2 is equivalent to the second hash gene in the embodiment of FIG. 2A and FIG. 2B, the link L5 is equivalent to the fourth link in the embodiment of FIG. 2A and FIG. 2B, and the forwarding node N5 is equivalent to the fourth forwarding node in the embodiment of FIG. 2A and FIG. 2B. If S509 is performed after S507 in which the controller determines that the link L4 is in a congested state after the available bandwidth of the link L4 is occupied by the packet flow F1, the hash gene H2 is equivalent to the third hash gene in the embodiment of FIG. 2A and FIG. 2B, the link L4 is equivalent to the sixth link in the embodiment of FIG. 2A and FIG. 2B, the link L6 is equivalent to the seventh link in the embodiment of FIG. 2A and FIG. 2B, the forwarding node N5 is equivalent to the sixth forwarding node in the embodiment of FIG. 2A and FIG. 2B, and the forwarding node N4 is equivalent to the fifth forwarding node in the embodiment of FIG. 2A and FIG. 2B and is also equivalent to the seventh forwarding node in the embodiment of FIG. 2A and FIG. 2B.

S513. The controller selects a link L7 that may be used to forward the packet flow F1.

The link L7 is equivalent to the eighth link in the foregoing embodiment of FIG. 2A and FIG. 2B.

S514. The controller determines and selects a hash gene H3 that is on the forwarding node N1 and that corresponds to the link L7.

In this embodiment, the link L7 on the forwarding node N1 may be corresponding to only one hash gene, that is, the hash gene H3. The hash gene H3 is equivalent to the fourth hash gene in the foregoing embodiment of FIG. 2A and FIG. 2B.

S515. The controller determines that the packet flow F1 encapsulated with the hash gene H3 reaches a forwarding node N6 after being forwarded by using the link L7, determines, according to the hash gene H3, that the packet flow F1 encapsulated with the hash gene H3 is to be forwarded by using a link L8, and determines whether the link L8 is in a congested state after available bandwidth of the link L8 is occupied by the packet flow F1. If the link L8 is not in a congested state, S516 is performed; or if the link L8 is in a congested state, S517 is performed.

For a process in which the controller determines the forwarding node N6, determines the link L8, and determines whether the link L8 is congested after the available bandwidth of the link L8 is occupied by the packet flow F1, refer to descriptions for the forwarding node N2 and the link L3 in S506. Details are not described in this embodiment.

S516. The controller determines that the packet flow F1 encapsulated with the hash gene H3 reaches a forwarding node N4 after being forwarded by using the link L8, determines the forwarding node N4 as a destination node of the packet flow F1, and delivers the hash gene H3 to a source node of the packet flow F1.

In S516, when the forwarding node N4 is the destination node of the packet flow F1, the controller determines that if the hash gene H3 is encapsulated in the packet flow F1, all forwarding paths from the forwarding node N1 to the destination node are not congested. Therefore, the hash gene H3 is used to adjust a forwarding path of the packet flow F1, so that a congestion degree of the link L1 can be reduced, and no new congested link appears in the network after the packet flow F1 is adjusted.

S517. The controller selects a packet flow F2 forwarded by using the link L1, and processes the packet flow F2 in a manner of processing the packet flow F1 in S504 to S517 until some packet flows on the congested link L1 are adjusted to another link.

S517 is a process of repeatedly selecting a packet flow and a hash gene, to finally select a hash gene for a packet flow on the link L1. The controller determines that if the hash gene is encapsulated in the packet flow, all forwarding paths from the forwarding node N1 to the destination node are not congested, and delivers the hash gene to a source node of the packet flow. After adjusting a forwarding path of a packet flow for the link L1, the controller may further adjust a forwarding path of a packet flow on another link that is in a congested state in the network until there is no congested link in the network. In this way, load of the network is balanced.

The application scenario in this embodiment is only an example of the embodiments described in the present disclosure, and the embodiments described in the present disclosure are not limited to this application scenario.

Figure 6:
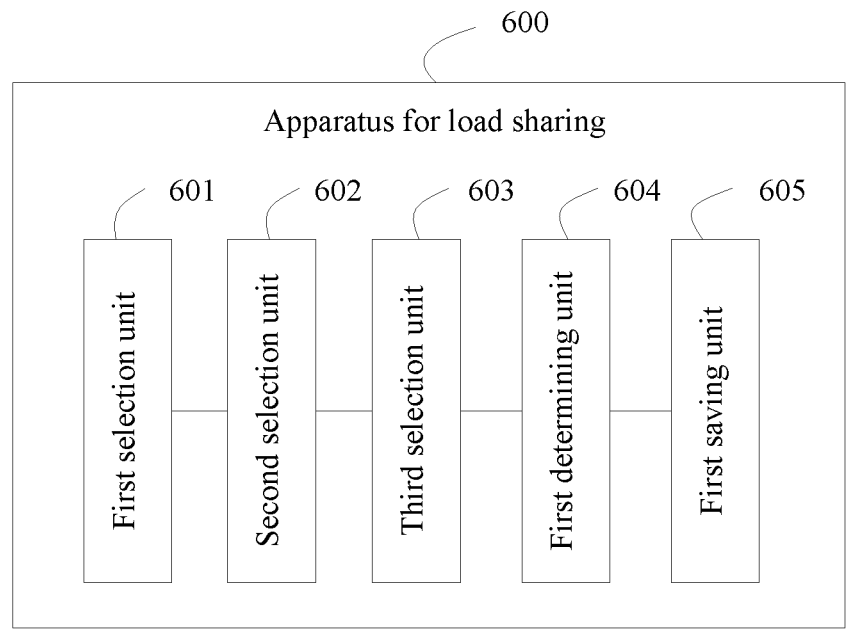
FIG. 6 is a schematic structural diagram of an apparatus for implementing load sharing according to an embodiment of the present disclosure.

FIG. 6 is a schematic structural diagram of an apparatus 600 for implementing load sharing according to an embodiment of the present disclosure. The apparatus 600 specifically includes:

a first selection unit 601, configured to select a packet flow forwarded by using a first link, where the first link is a link in a congested state on a first forwarding node;

a second selection unit 602, configured to select a second link that may be used to forward the packet flow, where the second link is a link that is not in a congested state after available bandwidth of the link is occupied by the packet flow, and the second link is a link between the first forwarding node and a second forwarding node;

a third selection unit 603, configured to select a first hash gene corresponding to the second link;

a first determining unit 604, configured to determine that a third link is not in a congested state after available bandwidth of the third link is occupied by the packet flow, where the third link is a link that is on the second forwarding node and that corresponds to the first hash gene, and the third link is a link between the second forwarding node and a third forwarding node; and a first saving unit 605, configured to save the first hash gene in a source node of the packet flow.

For example, the apparatus shown in FIG. 6 for implementing load sharing may be configured to perform the method shown in FIG. 2A and FIG. 2B. Specifically, the first selection unit 601 may be configured to perform S201 in FIG. 2A and FIG. 2B. The second selection unit 602 may be configured to perform S202 in FIG. 2A and FIG. 2B. The third selection unit 603 may be configured to perform S203 in FIG. 2A and FIG. 2B. The first determining unit 604 may be configured to perform S204 in FIG. 2A and FIG. 2B. The first saving unit 605 may be configured to perform S205 in FIG. 2A and FIG. 2B.

Optionally, the first determining unit 604 may be specifically configured to: determine, according to the first hash gene, that the packet flow is forwarded by using the third link, where the third link is specifically a link corresponding to a result obtained by calculating the first hash gene by using a hash algorithm of the second forwarding node; and determine, according to bandwidth occupied by the packet flow and total bandwidth and used bandwidth of the third link, that the third link is not in a congested state after the available bandwidth of the third link is occupied by the packet flow.

Optionally, the apparatus 600 may further include:

a second determining unit, configured to: after the third selection module selects the first hash gene, determine that the third link is in a congested state after the available bandwidth of the third link is occupied by the packet flow;

a fourth selection unit, configured to select a second hash gene corresponding to the second link;

a fifth determining unit, configured to determine that a fourth link is not in a congested state after available bandwidth of the fourth link is occupied by the packet flow, where the fourth link is a link that is on the second forwarding node and that corresponds to the second hash gene, and the fourth link is a link between the second forwarding node and a fourth forwarding node; and a second saving unit, configured to save the second hash gene in the source node of the packet flow.

Optionally, the apparatus 600 may further include:

a sixth determining unit, configured to: after the first determining unit determines that the third link is not in a congested state after the available bandwidth of the third link is occupied by the packet flow, determine that a fifth link is not in a congested state after available bandwidth of the fifth link is occupied by the packet flow, where the fifth link is a link that is on the third forwarding node and that corresponds to the first hash gene, and the fifth link is a link between the third forwarding node and a fifth forwarding node; and a triggering unit, configured to trigger the first saving unit to save the first hash gene in the source node of the packet flow.

Optionally, the apparatus 600 may further include:

a seventh determining unit, configured to: after the first determining unit determines that the third link is not in a congested state after the available bandwidth of the third link is occupied by the packet flow, determine that the fifth link is in a congested state after the available bandwidth of the fifth link is occupied by the packet flow;

a fifth selection unit, configured to select a third hash gene corresponding to the second link;

an eighth determining unit, configured to determine that a sixth link is not in a congested state after available bandwidth of the sixth link is occupied by the packet flow and that a seventh link is not in a congested state after available bandwidth of the seventh link is occupied by the packet flow, where the sixth link is a link that is on the second forwarding node and that corresponds to the third hash gene, the sixth link is a link between the second forwarding node and a sixth forwarding node, the seventh link is a link that is on the sixth forwarding node and that corresponds to the third hash gene, and the seventh link is a link between the sixth forwarding node and a seventh forwarding node; and a third saving unit, configured to save the third hash gene in the source node of the packet flow.

Optionally, the apparatus 600 may further include:

a second determining unit, configured to: after the first selection unit selects the first hash gene, determine that the third link is in a congested state after the available bandwidth of the third link is occupied by the packet flow;

a sixth selection unit, configured to select an eighth link that may be used to forward the packet flow, where the eighth link is a link that is not in a congested state after available bandwidth of the link is occupied by the packet flow, and the eighth link is a link between the first forwarding node and an eighth forwarding node;

a seventh selection unit, configured to select a fourth hash gene corresponding to the eighth link;

a ninth determining unit, configured to determine that a ninth link is not in a congested state after available bandwidth of the ninth link is occupied by the packet flow, where the ninth link is a link that is on the eighth forwarding node and that corresponds to the fourth hash gene, and the ninth link is a link between the eighth forwarding node and a ninth forwarding node; and a fourth saving unit, configured to save the fourth hash gene in the source node of the packet flow.

The apparatus 600 in this embodiment corresponds to the network device mentioned in the embodiment shown in FIG. 2A and FIG. 2B. For one embodiment in which the apparatus 600 in this embodiment performs the method, refer to detailed descriptions in the foregoing embodiment of FIG. 2A and FIG. 2B. Details are not described in this embodiment.

According to the technical solution in this embodiment, for the first link in a congested state, the apparatus 600 selects, by using the first selection unit 601, the packet flow forwarded by using the first link, selects, by using the second selection unit 602 and the third selection unit 603, a hash gene used for adjusting the packet flow from the first link to another link, determines, by using the first determining unit 604, that a forwarding path of the packet flow includes at least two non-congested links if the hash gene is encapsulated in the packet flow, and saves the hash gene in the source node of the packet flow by using the first saving unit 605. Therefore, after the source node encapsulates the hash gene in the packet flow, in the prior art, it can only be ensured that a forwarding path of the packet flow has a non-congested link on the source node, and by contrast, in this embodiment, it can be ensured that the forwarding path of the packet flow has at least two non-congested links, so that network load is more balanced.

Figure 7:
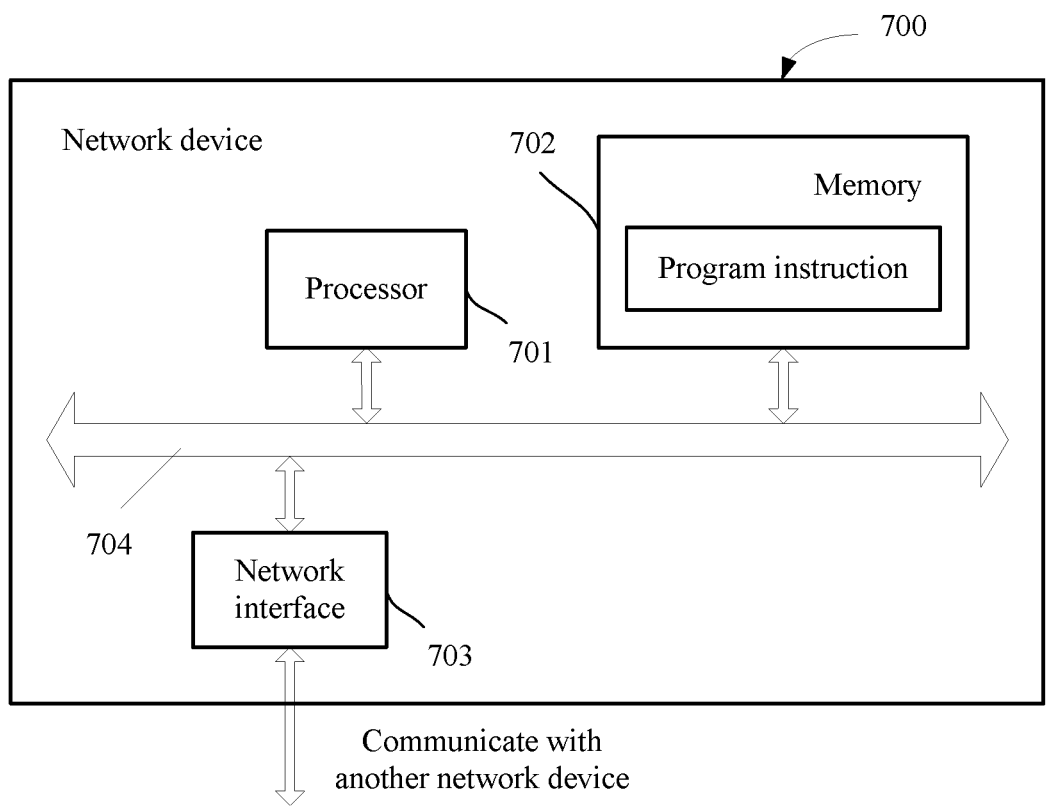
FIG. 7 is a schematic structural diagram of hardware of a network device according to an embodiment of the present disclosure.

FIG. 7 is a schematic structural diagram of hardware of a network device 700 according to an embodiment of the present disclosure. The network device 700 may be configured to implement load sharing. That is, the network device 700 may be configured to perform the method provided in the foregoing embodiment. In this embodiment, the network device 700 includes a processor 701, a memory 702, a network interface 703, and a bus system 704.

The bus system 704 is configured to couple hardware components of the network device 700.

The network interface 703 is configured to implement a communication connection between the network device 700 and at least one another network device over the Internet, a wide area network, a local area network, a metropolitan area network, or the like.

The memory 702 is configured to store a program instruction and data.

The processor 701 is configured to read the instruction and the data that are stored in the memory 702, to execute the following operations:

selecting a packet flow forwarded by using a first link, where the first link is a link in a congested state on a first forwarding node;

selecting a second link that may be used to forward the packet flow, where the second link is a link that is not in a congested state after available bandwidth of the link is occupied by the packet flow, and the second link is a link between the first forwarding node and a second forwarding node;

selecting a first hash gene corresponding to the second link;

determining that a third link is not in a congested state after available bandwidth of the third link is occupied by the packet flow, where the third link is a link that is on the second forwarding node and that corresponds to the first hash gene, and the third link is a link between the second forwarding node and a third forwarding node; and saving the first hash gene in a source node of the packet flow.

Optionally, after selecting the first hash gene corresponding to the second link, the processor 701 may further perform the following operations:

determining that the third link is in a congested state after the available bandwidth of the third link is occupied by the packet flow, and selecting a second hash gene corresponding to the second link;

determining that a fourth link is not in a congested state after available bandwidth of the fourth link is occupied by the packet flow, where the fourth link is a link that is on the second forwarding node and that corresponds to the second hash gene, and the fourth link is a link between the second forwarding node and a fourth forwarding node; and saving the second hash gene in the source node of the packet flow.

Optionally, after determining that the third link is not in a congested state after the available bandwidth of the third link is occupied by the packet flow, the processor 701 may further perform the following operations:

determining that a fifth link is not in a congested state after available bandwidth of the fifth link is occupied by the packet flow, and performing the step of saving the first hash gene in a source node of the packet flow.

The fifth link is a link that is on the third forwarding node and that corresponds to the first hash gene, and the fifth link is a link between the third forwarding node and a fifth forwarding node.

Optionally, after determining that the third link is not in a congested state after the available bandwidth of the third link is occupied by the packet flow, the processor 701 may further perform the following operations:

determining that the fifth link is in a congested state after the available bandwidth of the fifth link is occupied by the packet flow;

selecting a third hash gene corresponding to the second link;

determining that a sixth link is not in a congested state after available bandwidth of the sixth link is occupied by the packet flow and that a seventh link is not in a congested state after available bandwidth of the seventh link is occupied by the packet flow, where the sixth link is a link that is on the second forwarding node and that corresponds to the third hash gene, the sixth link is a link between the second forwarding node and a sixth forwarding node, the seventh link is a link that is on the sixth forwarding node and that corresponds to the third hash gene, and the seventh link is a link between the sixth forwarding node and a seventh forwarding node; and saving the third hash gene in the source node of the packet flow.

Optionally, after selecting the first hash gene corresponding to the second link, the processor 701 may further perform the following operations:

determining that the third link is in a congested state after the available bandwidth of the third link is occupied by the packet flow, and selecting an eighth link that may be used to forward the packet flow, where the eighth link is a link that is not in a congested state after available bandwidth of the link is occupied by the packet flow, and the eighth link is a link between the first forwarding node and an eighth forwarding node;

selecting a fourth hash gene corresponding to the eighth link;

determining that a ninth link is not in a congested state after available bandwidth of the ninth link is occupied by the packet flow, where the ninth link is a link that is on the eighth forwarding node and that corresponds to the fourth hash gene, and the ninth link is a link between the eighth forwarding node and a ninth forwarding node; and saving the fourth hash gene in the source node of the packet flow.

Optionally, to determine that the third link is not in a congested state after the available bandwidth of the third link is occupied by the first packet flow, the processor 701 may perform the following operations:

determining, according to the first hash gene, that the packet flow is forwarded by using the third link, where the third link is specifically a link corresponding to a result obtained by calculating the first hash gene by using a hash algorithm of the second forwarding node; and determining, according to bandwidth occupied by the packet flow and total bandwidth and used bandwidth of the third link, that the third link is not in a congested state after the available bandwidth of the third link is occupied by the packet flow.

The network device 700 in this embodiment corresponds to the network device in the foregoing embodiment shown in FIG. 2A and FIG. 2B. For various specific implementations in which the processor 701 of the network device 700 in this embodiment performs the operations, refer to detailed descriptions in the foregoing embodiment shown in FIG. 2A and FIG. 2B. Details are not described in this embodiment.

The "first" in names such as "first forwarding node", "first link", and "first hash gene" that are mentioned in the embodiments described in the present disclosure is merely used as a name identifier, and does not mean being the first in a sequence. This rule is also applicable to "second", "third", "fourth", "fifth", "sixth", "seventh", "eighth", and "ninth".

The processor in the embodiments described in the present disclosure may be an integrated circuit chip, and has a signal processing capability. In an implementation process, steps in the foregoing methods can be implemented by using a hardware integrated logical circuit in the processor, or by using instructions in a form of software. These instructions may be implemented and controlled by means of cooperation of the processor, and are used to perform the method disclosed in the embodiments described in the present disclosure. The foregoing processor may also be a general purpose processor, a digital signal processor (DSP), an application-specific integrated circuit (application specific integrated circuit), a field programmable gate array (FPGA) or another programmable logical device, a discrete gate or a transistor logical device, or a discrete hardware component.

The general purpose processor may be a microprocessor or the processor may be any conventional processor, decoder, or the like. The steps of the method disclosed with reference to the embodiments described in the present disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like.

In addition, the bus system may further include a power bus, a control bus, a status signal bus, and the like, in addition to a data bus. However, for clear description, various types of buses in FIG. 7 are marked as the bus system.

From the foregoing descriptions of the implementations, persons skilled in the art may clearly understand that some or all steps of the methods in the embodiments may be implemented by software in addition to a universal hardware platform. Based on such an understanding, the technical solutions of the present disclosure essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device such as media gateway) to perform the methods described in the embodiments or some parts of the embodiments described in the present disclosure.

The embodiments in this disclosure are all described in a progressive manner, for same or similar parts in the embodiments, reference may be made to these embodiments, and each embodiment focuses on a difference from other embodiments. Especially, method and apparatus embodiments are basically similar to a system embodiment, and therefore are described briefly. For related parts, refer to partial descriptions in the system embodiment. The described device and system embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. Persons of ordinary skill in the art may understand and implement the embodiments described in the present disclosure without creative efforts.

The foregoing descriptions are merely example embodiments described in the present disclosure, and are not intended to limit the protection scope of the present disclosure. It should be noted that persons of ordinary skill in the art may make certain improvements and polishing without departing from the principle of the present application and the improvements and polishing shall fall within the protection scope of the present disclosure.

What is claimed is:

1. A method for implementing load sharing, comprising:
   selecting, by a network device, a packet flow forwarded through a first link, wherein the first link is a link in a congested state on a first forwarding node;
   selecting, by the network device, a second link to forward the packet flow, wherein the second link is a link not in a congested state after available bandwidth of the link is occupied by the packet flow, and the second link is a link between the first forwarding node and a second forwarding node;
   selecting, by the network device, a first hash gene corresponding to the second link;
   determining, by the network device, that a third link is not in a congested state after available bandwidth of the third link is occupied by the packet flow, wherein the third link is a link on the second forwarding node and corresponding to the first hash gene, and the third link is a link between the second forwarding node and a third forwarding node; and
   saving, by the network device, the first hash gene in a source node of the packet flow.

2. The method according to claim 1, after selecting, by the network device, the first hash gene corresponding to the second link, the method further comprises:
   determining, by the network device, that the third link is in a congested state after the available bandwidth of the third link is occupied by the packet flow, and selecting a second hash gene corresponding to the second link;
   determining, by the network device, that a fourth link is not in a congested state after available bandwidth of the fourth link is occupied by the packet flow, wherein the fourth link is a link on the second forwarding node and corresponding to the second hash gene, and the fourth link is a link between the second forwarding node and a fourth forwarding node; and
   saving, by the network device, the second hash gene in the source node of the packet flow.

3. The method according to claim 1, after determining, by the network device, that the third link is not in a congested state after available bandwidth of the third link is occupied by the packet flow, the method further comprises:
   determining, by the network device, that a fifth link is not in a congested state after available bandwidth of the fifth link is occupied by the packet flow, and saving the first hash gene in a source node of the packet flow, wherein
   the fifth link is a link on the third forwarding node and corresponding to the first hash gene, and the fifth link is a link between the third forwarding node and a fifth forwarding node.

4. The method according to claim 3, after determining, by the network device, that the third link is not in a congested state after available bandwidth of the third link is occupied by the packet flow, the method further comprises:
   determining, by the network device, that the fifth link is in a congested state after the available bandwidth of the fifth link is occupied by the packet flow, and selecting a third hash gene corresponding to the second link;
   determining, by the network device, that a sixth link is not in a congested state after available bandwidth of the sixth link is occupied by the packet flow and that a seventh link is not in a congested state after available bandwidth of the seventh link is occupied by the packet flow, wherein the sixth link is a link on the second forwarding node and corresponding to the third hash gene, the sixth link is a link between the second forwarding node and a sixth forwarding node, the seventh link is a link that is on the sixth forwarding node and corresponding to the third hash gene, and the seventh link is a link between the sixth forwarding node and a seventh forwarding node; and
   saving, by the network device, the third hash gene in the source node of the packet flow.

5. The method according to claim 1, after the selecting, by the network device, a first hash gene corresponding to the second link, the method further comprises:
   determining, by the network device, that the third link is in a congested state after the available bandwidth of the third link is occupied by the packet flow, and selecting an eighth link to forward the packet flow, wherein the eighth link is a link that is not in a congested state after available bandwidth of the link is occupied by the packet flow, and the eighth link is a link between the first forwarding node and an eighth forwarding node;

selecting, by the network device, a fourth hash gene corresponding to the eighth link;

determining, by the network device, that a ninth link is not in a congested state after available bandwidth of the ninth link is occupied by the packet flow, wherein the ninth link is a link on the eighth forwarding node and corresponding to the fourth hash gene, and the ninth link is a link between the eighth forwarding node and a ninth forwarding node; and saving, by the network device, the fourth hash gene in the source node of the packet flow.

6. The method according to claim 1, wherein determining, by the network device, that a third link is not in a congested state after available bandwidth of the third link is occupied by the packet flow comprises:

determining, by the network device according to the first hash gene, that the packet flow is forwarded through the third link, wherein the third link is a link corresponding to a result obtained by calculating the first hash gene by using a hash algorithm of the second forwarding node; and determining, by the network device according to bandwidth occupied by the packet flow and total bandwidth and used bandwidth of the third link, that the third link is not in a congested state after the available bandwidth of the third link is occupied by the packet flow.

7. An apparatus for implementing load sharing, comprising:

a processor; and a computer-readable storage medium storing a program to be executed by the processor, the program including instructions that, when executed by the processor, cause the processor to:

select a packet flow forwarded through a first link, wherein the first link is a link in a congested state on a first forwarding node;

select a second link to forward the packet flow, wherein the second link is a link not in a congested state after available bandwidth of the link is occupied by the packet flow, and the second link is a link between the first forwarding node and a second forwarding node;

select a first hash gene corresponding to the second link;

determine that a third link is not in a congested state after available bandwidth of the third link is occupied by the packet flow, wherein the third link is a link on the second forwarding node and corresponding to the first hash gene, and the third link is a link between the second forwarding node and a third forwarding node; and save the first hash gene in a source node of the packet flow.

8. The apparatus according to claim 7, wherein the program further includes instructions that, when executed, cause the processor to:

after selecting the first hash gene, determine that the third link is in a congested state after the available bandwidth of the third link is occupied by the packet flow;

select a second hash gene corresponding to the second link;

determine that a fourth link is not in a congested state after available bandwidth of the fourth link is occupied by the packet flow, wherein the fourth link is a link on the second forwarding node and corresponding to the second hash gene, and the fourth link is a link between the second forwarding node and a fourth forwarding node; and save the second hash gene in the source node of the packet flow.

9. The apparatus according to claim 7, wherein the program further includes instructions that, when executed, cause the processor to:

after determining that the third link is not in a congested state after the available bandwidth of the third link is occupied by the packet flow, determine that a fifth link is not in a congested state after available bandwidth of the fifth link is occupied by the packet flow, wherein the fifth link is a link on the third forwarding node and corresponding to the first hash gene, and the fifth link is a link between the third forwarding node and a fifth forwarding node; and save the first hash gene in the source node of the packet flow.

10. The apparatus according to claim 9, wherein the program further includes instructions that, when executed, cause the processor to:

after determining that the third link is not in a congested state after the available bandwidth of the third link is occupied by the packet flow, determine that the fifth link is in a congested state after the available bandwidth of the fifth link is occupied by the packet flow;

select a third hash gene corresponding to the second link;

determine that a sixth link is not in a congested state after available bandwidth of the sixth link is occupied by the packet flow and that a seventh link is not in a congested state after available bandwidth of the seventh link is occupied by the packet flow, wherein the sixth link is a link on the second forwarding node and corresponding to the third hash gene, the sixth link is a link between the second forwarding node and a sixth forwarding node, the seventh link is a link on the sixth forwarding node and corresponding to the third hash gene, and the seventh link is a link between the sixth forwarding node and a seventh forwarding node; and save the third hash gene in the source node of the packet flow.

11. The apparatus according to claim 7, wherein the program further includes instructions that, when executed, cause the processor to:

after selecting the first hash gene, determine that the third link is in a congested state after the available bandwidth of the third link is occupied by the packet flow;

select an eighth link to forward the packet flow, wherein the eighth link is a link that is not in a congested state after available bandwidth of the link is occupied by the packet flow, and the eighth link is a link between the first forwarding node and an eighth forwarding node;

select a fourth hash gene corresponding to the eighth link;

determine that a ninth link is not in a congested state after available bandwidth of the ninth link is occupied by the packet flow, wherein the ninth link is a link on the eighth forwarding node and corresponding to the fourth hash gene, and the ninth link is a link between the eighth forwarding node and a ninth forwarding node; and save the fourth hash gene in the source node of the packet flow.

12. The apparatus according to claim 7, wherein the program includes further instructions that, when executed:

determine, according to the first hash gene, that the packet flow is forwarded by using the third link, wherein the third link is a link corresponding to a result obtained by calculating the first hash gene by using a hash algorithm of the second forwarding node; and determine, according to bandwidth occupied by the packet flow and total bandwidth and used bandwidth of the third link, that the third link is not in a congested state after the available bandwidth of the third link is occupied by the packet flow.

\* \* \* \* \*